(12) United States Patent
Mizushima et al.

(10) Patent No.: US 11,404,928 B2
(45) Date of Patent: Aug. 2, 2022

(54) STATOR, METHOD FOR MANUFACTURING STATOR, COIL, AND METHOD FOR MANUFACTURING COIL

(71) Applicant: TOYOTA JIDOSHA KABUSHIKI KAISHA, Toyota (JP)

(72) Inventors: Daisuke Mizushima, Toyota (JP); Yasuyuki Hirao, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 339 days.

(21) Appl. No.: 16/722,951

(22) Filed: Dec. 20, 2019

(65) Prior Publication Data

US 2020/0204028 A1 Jun. 25, 2020

(30) Foreign Application Priority Data

Dec. 25, 2018 (JP) .............................. JP2018-240629

(51) Int. Cl.
*H02K 3/28* (2006.01)
*H02K 1/16* (2006.01)
*H02K 15/00* (2006.01)

(52) U.S. Cl.
CPC ................. *H02K 3/28* (2013.01); *H02K 1/16* (2013.01); *H02K 15/0081* (2013.01)

(58) Field of Classification Search
CPC .................................. H02K 3/28; H02K 1/16
See application file for complete search history.

(56) References Cited

U.S. PATENT DOCUMENTS

| 3,978,359 | A | * | 8/1976 | Kultzow | ................ | H02K 3/505 |
| | | | | | | 310/260 |
| 6,353,198 | B1 | | 3/2002 | Tong et al. | | |
| 9,362,793 | B2 | | 6/2016 | Iki et al. | | |
| 10,250,093 | B2 | * | 4/2019 | Hattori | ..................... | H02K 3/12 |
| 10,389,199 | B2 | * | 8/2019 | Langlard | .................. | H02K 3/12 |
| 11,075,560 | B2 | * | 7/2021 | Matsumoto | ........ | H02K 15/0421 |
| 11,081,945 | B2 | * | 8/2021 | Nishikuma | ............. | B23P 19/02 |
| 2013/0300232 | A1 | | 11/2013 | Jung | | |
| 2015/0270747 | A1 | * | 9/2015 | Toliyat | ................... | H02K 5/132 |
| | | | | | | 310/156.01 |
| 2016/0006312 | A1 | * | 1/2016 | Kowalski | ............... | H02K 19/36 |
| | | | | | | 310/71 |

(Continued)

FOREIGN PATENT DOCUMENTS

| JP | 2007-192624 A | 8/2007 |
| JP | 5389109 B2 | 10/2013 |

(Continued)

*Primary Examiner* — Robert W Horn
(74) *Attorney, Agent, or Firm* — Sughrue Mion, PLLC

(57) ABSTRACT

A coil includes a plurality of segment coils. Ends of two corresponding segment coils are electrically connected together via a coupling member or by being fitted together. Each of the plurality of segment coils includes a conductor-exposed portion located close to a connection portion between the corresponding segment coils and to be brought into contact with a probe of a resistance measurement apparatus. When the coil is manufactured, the ends of the plurality of segment coils are electrically connected to the ends of other corresponding segment coils, and electric resistances of connection portions between the ends are measured for each layer of the ends of the segment coils.

9 Claims, 25 Drawing Sheets

(56) References Cited

U.S. PATENT DOCUMENTS

| | | | |
|---|---|---|---|
| 2016/0087502 A1* | 3/2016 | Rumbaugh | F04D 29/026 |
| | | | 310/71 |
| 2016/0172919 A1* | 6/2016 | Hattori | H02K 3/48 |
| | | | 29/596 |
| 2017/0292996 A1 | 10/2017 | Desabhatla et al. | |
| 2018/0309337 A1* | 10/2018 | Lee | H02K 3/28 |
| 2019/0222087 A1* | 7/2019 | Matsumoto | H02K 15/024 |
| 2020/0044495 A1* | 2/2020 | Hattori | H02K 1/148 |
| 2020/0169152 A1* | 5/2020 | Matsumoto | H02K 3/48 |
| 2020/0204028 A1* | 6/2020 | Mizushima | H02K 3/12 |
| 2020/0287434 A1* | 9/2020 | Dunn | H02K 3/50 |

FOREIGN PATENT DOCUMENTS

| | | |
|---|---|---|
| JP | 2015-023771 A | 2/2015 |
| JP | 5962607 B2 | 7/2016 |
| JP | 2019-126153 A | 7/2019 |
| KR | 10-2013-0127058 A | 11/2013 |
| KR | 10-2017-0116585 A | 10/2017 |
| WO | 2015/011542 A2 | 1/2015 |

\* cited by examiner

FIG. 12
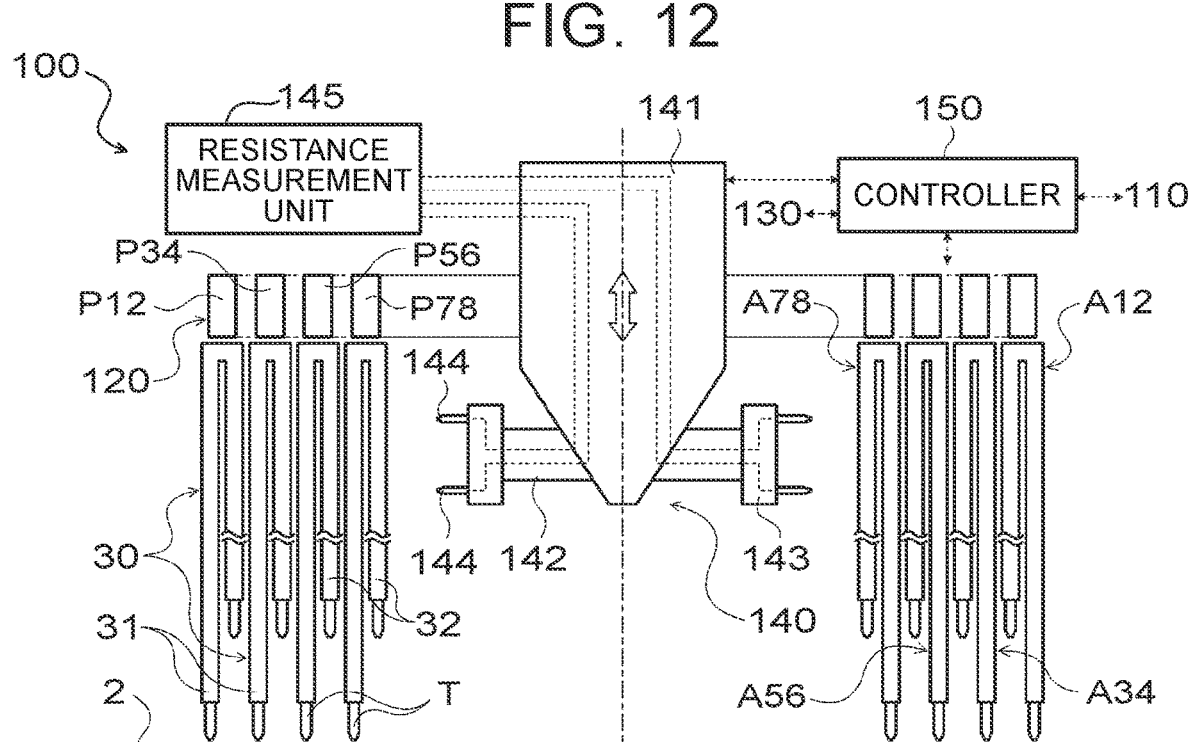
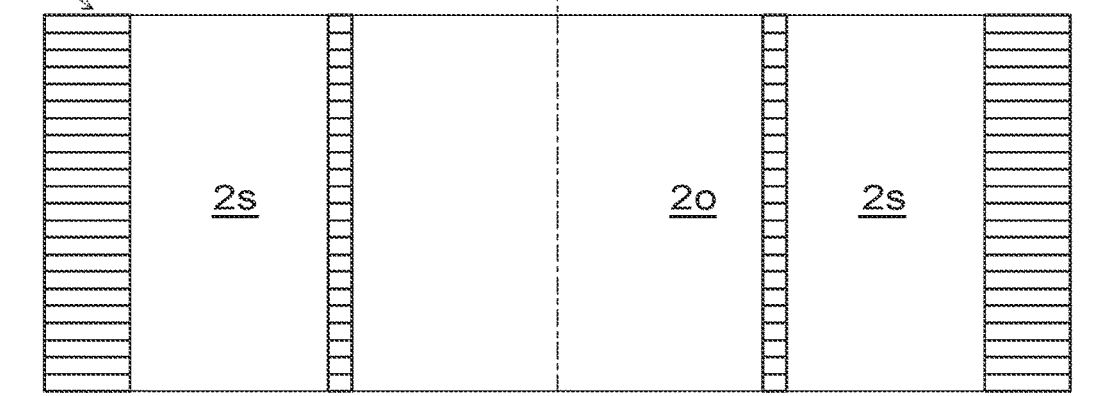
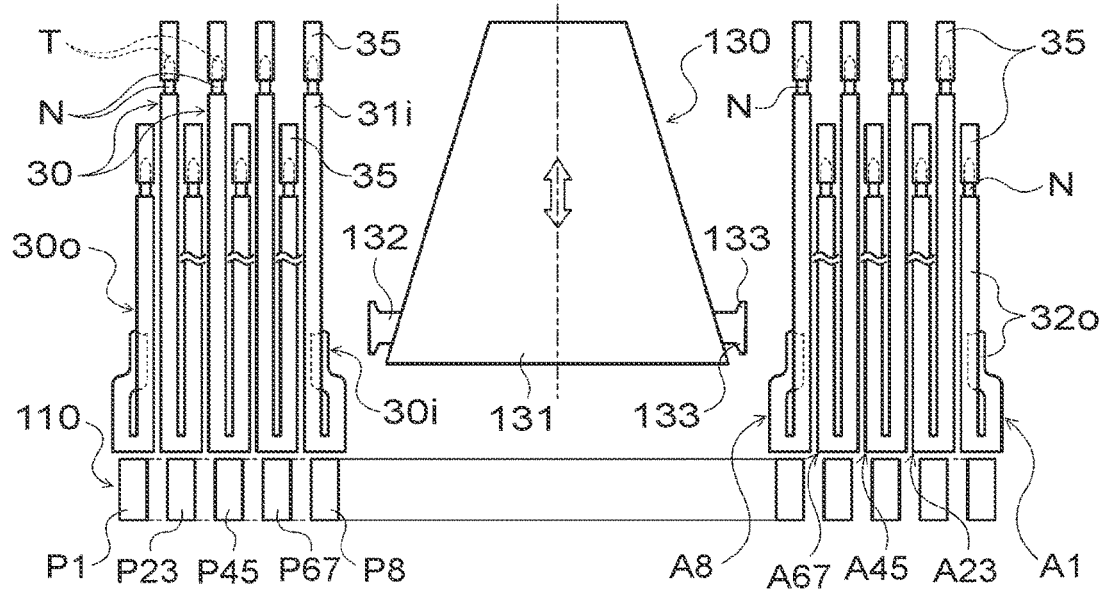

STATOR, METHOD FOR MANUFACTURING STATOR, COIL, AND METHOD FOR MANUFACTURING COIL

INCORPORATION BY REFERENCE

The disclosure of Japanese Patent Application No. 2018-240629 filed on Dec. 25, 2018 including the specification, drawings and abstract is incorporated herein by reference in its entirety.

BACKGROUND

1. Technical Field

The present disclosure relates to a stator for a rotating electrical machine, a method for manufacturing the stator, a coil, and a method for manufacturing the coil.

2. Description of Related Art

Hitherto, there is known a stator for a rotating electrical machine, including a stator core, a one-side conductor segment, a first other-side conductor segment, and a second other-side conductor segment (see, for example, Japanese Patent No. 5962607). The stator core has a plurality of first and second slots. The one-side conductor segment has first and second legs inserted into the first and second slots from one axial end side of the stator core. The first other-side conductor segment has a leg inserted into the first slot from the other axial end side of the stator core. The second other-side conductor segment has a leg inserted into the second slot from the other axial end side of the stator core. In this stator, the end faces of the legs that face each other in each slot are joined together, thereby forming a stator coil by the plurality of one-side and other-side conductor segments. Hitherto, there is known a stator for a rotating electrical machine, including a stator core having a plurality of slots, and segmented coils of a plurality of phases (see, for example, Japanese Patent No. 5389109). In this stator, the coils of the plurality of phases are formed by a plurality of coil bars extending substantially linearly and inserted into the plurality of slots of the stator core, and a plurality of connecting coils that connect coil bars of the same phase to form bridges.

SUMMARY

In the stators described above, the electric resistance of the entire stator coil formed by the plurality of segment coils connected together is generally measured by causing a current to flow through the stator coil. Thus, determination is made whether connection failure occurs in connection portions between the segment coils. For example, if the connection failure occurs in one connection portion, the electric resistance of the entire stator coil does not significantly change as compared to those of standard products. Based on the result of measurement of the electric resistance, determination may be made that the connection failure occurs in none of the connection portions. When the electric resistance of the entire stator coil is measured by causing a current to flow through the stator coil, a connection portion where the connection failure occurs cannot be identified. Even if the connection failure occurs in only a few connection portions, there is a possibility of trouble such as a decrease in power of the rotating electrical machine including the stator.

The present disclosure provides a technique to further improve the reliability of a coil formed by electrically connecting a plurality of segment coils while identifying a connection portion between the segment coils where connection failure occurs.

A first aspect of the present disclosure relates to a stator. The stator includes a stator core and a plurality of segment coils. The stator core includes a plurality of slots extending in a radial direction and formed at intervals in a circumferential direction. The segment coils form a stator coil through electrical connection between corresponding ends. At least parts of the segment coils are attached to the stator core so as to adjoin each other in the radial direction in each of the slots. In the stator, the corresponding ends are electrically connected together via a coupling member or by being fitted together. Each of the segment coils includes a conductor-exposed portion located close to a connection portion between the corresponding segment coils and configured to be brought into contact with a probe of a resistance measurement apparatus.

In the stator having the structure described above, the ends of two corresponding segment coils are electrically connected together via the coupling member or by being fitted together. When the ends of the two corresponding segment coils are connected together, the conductor-exposed portions of the two segment coils are arranged close to both sides of the connection portion between the segment coils. By bringing a pair of probes of the resistance measurement apparatus into contact with the two conductor-exposed portions close to the connection portion between the ends of the two corresponding segment coils, the electric resistance of the connection portion can be measured accurately. As a result, in the stator in which the ends of the two corresponding segment coils are electrically connected together via the coupling member or by being fitted together, the reliability of the stator can further be improved by identifying the connection portion between the segment coils (ends) where the connection failure occurs and eliminating the connection failure in the identified connection portion. It is appropriate that the conductor-exposed portion be close to the connection portion between the segment coils so that at least variations in measurement of the electric resistance is kept equal to or smaller than a permissible value. The conductor-exposed portion may adjoin the connection portion.

The stator of the first aspect may include a plurality of the coupling members each electrically connecting the ends of the segment coils fitted to both ends of each of the coupling members. Each of the segment coils may be a conductor having an insulating film formed on its surface. The conductor may be exposed at the end of each of the segment coils. The conductor-exposed portion may be a part of the end of each of the segment coils, which is exposed from the coupling member. Thus, the conductor-exposed portions having necessary and sufficient areas can be arranged with an appropriate distance therebetween on both sides of the connection portion between the ends of the segment coils without removing the insulating films at portions other than the ends of the segment coils.

In the stator of the first aspect, the coupling member may be a tubular conductor having an insulating film formed on its surface. The end of each of the segment coils may include a thin portion fitted into the coupling member, and a thick portion formed so as not to be fitted into the coupling member. Thus, the thick portions of the two corresponding segment coils can be used as the conductor-exposed portions by exposing the thick portions from the coupling member while electrically connecting the thin portions at the ends of the two segment coils by the coupling member. As a result, the conductor-exposed portions can be formed securely on both sides of the connection portion between the ends of the segment coils, that is, the coupling member that electrically connects the ends.

In the stator of the first aspect, the coupling member may be a tubular conductor having an insulating film formed on its surface. The coupling member may include a restriction member that restricts entry of the end of each of the segment coils into the coupling member so that the part of the end is exposed from the coupling member. By employing this structure as well, the parts of the ends of the two corresponding segment coils can be used as the conductor-exposed portions by exposing the parts of the ends from the coupling member while electrically connecting the ends of the two segment coils by the coupling member. As a result, the conductor-exposed portions can be formed securely on both sides of the connection portion between the ends of the segment coils.

In the stator of the first aspect, the segment coils may include a first segment coil including two legs inserted into the slots different from each other from one end face of the stator core, and a second segment coil including two legs inserted into the slots different from each other from another end face of the stator core. The end of the first segment coil and the end of the second segment coil may be tips of the legs. The end of the first segment coil and the end of the second segment coil may be electrically connected together by the coupling member in each of the slots. Thus, manufacturing costs of the stator can be reduced by suppressing an increase in the number of segment coils or the number of connection portions and saving labor for the step of connecting the segment coils. In addition, the height of the entire stator can be reduced by reducing the heights of the portions of the segment coils that are located on the outer side of the end faces of the stator core.

In the stator of the first aspect, the slots may be open to a central hole of the stator core. In each of the first segment coil and the second segment coil, one of the two legs, which is arranged on an inner side in the radial direction, may be shorter than the other one of the two legs, which is arranged on an outer side in the radial direction. Thus, it is possible to suppress the occurrence of a case where the probe inserted into the slot from the central hole cannot be brought into contact with the conductor-exposed portion near the connection portion between the legs arranged on the outer side in the radial direction by being obstructed by the legs arranged on the inner side in the radial direction.

In the stator of the first aspect, each of the slots may have an insulating member arranged between each of the segment coils and an inner wall of each of the slots.

In the stator of the first aspect, the segment coils may include a plurality of slot coils, a plurality of first coupling coils, a plurality of second coupling coils, and a plurality of third coupling coils. The slot coils are inserted into the corresponding slots. The first coupling coils each have a first connection hole formed at one end of each of the first coupling coils, and a second connection hole formed at another end of each of the first coupling coils. The first coupling coils are arranged along an end face of the stator core. The second coupling coils each have a first connection hole formed at one end of each of the second coupling coils, and a second connection hole formed at another end of each of the second coupling coils. The second coupling coils are arranged on an outer side of the first coupling coils in an axial direction of the stator core. The third coupling coils are each fitted to the second connection hole of each of the first coupling coils and the second connection hole of each of the second coupling coils. The ends of the slot coils different from each other may be fitted to the first connection hole of each of the first coupling coils and the first connection hole of each of the second coupling coils. The end of the slot coil fitted to the first connection hole of each of the first coupling coils may be electrically connected to the end of the slot coil fitted to the first connection hole of each of the second coupling coils via each of the first coupling coils, each of the third coupling coils, and each of the second coupling coils. The conductor-exposed portions may include an end face of the end of the slot coil fitted to the first connection hole of each of the first coupling coils, two parts on a surface of each of the first coupling coils, which is opposite to the stator core, an end face of each of the third coupling coils, which is opposite to the stator core, two parts on a surface of each of the second coupling coils, which is opposite to the stator core, and an end face of the end of the slot coil fitted to the first connection hole of each of the second coupling coils.

In the stator having the structure described above, when the end of the slot coil is fitted to one end of the first coupling coil and the end of the third coupling coil is fitted to another end of the first coupling coil, the electric resistances of the connection portion (fitting portion) between the slot coil and the first coupling coil and the connection portion (fitting portion) between the first coupling coil and the third coupling coil can be measured accurately by using, as the conductor-exposed portions, the end face of the end of the slot coil, two parts on the surface of the first coupling coil, and the end face of the third coupling coil. Further, when the end of the third coupling coil is fitted to another end of the second coupling coil and the end of another slot coil is fitted to one end of the second coupling coil, the electric resistances of the connection portion (fitting portion) between the third coupling coil and the second coupling coil and the connection portion (fitting portion) between the second coupling coil and another slot coil can be measured accurately by using, as the conductor-exposed portions, the end face of the third coupling coil, two parts on the surface of the second coupling coil, and the end face of the end of another slot coil. Thus, the reliability of the stator can further be improved by identifying the connection portion where the connection failure occurs and eliminating the connection failure in the identified connection portion.

The stator of the first aspect may further include a base member formed of an insulating material. The first coupling coils may be arranged on one surface of the base member, which is located close to the stator core. The second coupling coils may be arranged on another surface of the base member, which is located away from the stator core. The base member may have a first through hole, a second through hole, a third through hole, a fourth through hole, and a fifth through hole. The first through hole communicates with the first connection hole of each of the first coupling coils. The second through hole is located close to the first connection hole of each of the first coupling coils, and is arranged so as to reach the surface of each of the first coupling coils, which is opposite to the stator core. The third through hole is located close to the second connection hole of each of the first coupling coils, and is arranged so as to reach the surface of each of the first coupling coils, which is opposite to the stator core. The fourth through hole communicates with the second connection hole of each of the first coupling coils and the second connection hole of each of the second coupling coils. The fifth through hole communicates with the first connection hole of each of the second coupling coils.

Thus, when the end of the slot coil is fitted to one end of the first coupling coil and the end of the third coupling coil is fitted to another end of the first coupling coil, the probes can be brought into contact with the end face of the end of the slot coil and two parts on the surface of the first coupling coil through the first, second, and third through holes. Further, when the end of the third coupling coil is fitted to another end of the second coupling coil and the end of another slot coil is fitted to one end of the second coupling coil, the probes can be brought into contact with the end face of the third coupling coil and the end face of the end of the other slot coil through the first and second connection holes of the second coupling coil.

In the stator of the first aspect, a plurality of coupling coil units each including the first coupling coils, the second coupling coils, the third coupling coils, and the base member may be stacked on the end face of the stator core. Insulating members may be arranged between the end face of the stator core and the coupling coil units and between the stacked coupling coil units.

A second aspect of the present disclosure relates to a method for manufacturing a stator. The stator includes a stator core and a plurality of segment coils. The stator core includes a plurality of slots extending in a radial direction and formed at intervals in a circumferential direction. The plurality of segment coils form a stator coil through electrical connection between corresponding ends. At least parts of the segment coils are attached to the stator core so as to adjoin each other in the radial direction in each of the slots. The stator includes a plurality of layers each including the ends of the segment coils adjacent to each other in the circumferential direction. The layers are formed in the radial direction. The method includes: electrically connecting a plurality of the ends included in the same layer to the ends of the other corresponding segment coils, and measuring electric resistances of connection portions between the ends included in the same layer, and the electrical connection and the measurement are executed for each of the layers.

This method involves electrically connecting the ends of the segment coils to the ends of the other corresponding segment coils and measuring the electric resistances of the connection portions between the ends for each of the layers of the ends of the segment coils. In the stator finally obtained by intricately attaching the segment coils to the stator core, the electric resistances can be measured by accessing all the connection portions. As a result, the reliability of the stator can further be improved by identifying the connection portion between the segment coils where the connection failure occurs and eliminating the connection failure in the identified connection portion.

The ends included in the same layer may be electrically connected collectively to the ends of the other corresponding segment coils. Thus, the step of connecting the segment coils can be shortened.

In the method of the second aspect, the connection of the ends and the measurement of the electric resistances may be executed for each of the layers in order from an outer side to an inner side in the radial direction.

In the method of the second aspect, when connecting the ends of two of the corresponding segment coils, conductor-exposed portions configured to be brought into contact with probes of a resistance measurement apparatus may be formed on the two of the segment coils so as to be close to the connection portion. Thus, the electric resistance of the connection portion can be measured accurately such that the pair of probes of the resistance measurement apparatus are brought into contact with the two conductor-exposed portions close to the connection portion between the ends of the two corresponding segment coils.

In the method of the second aspect, each of the segment coils may be a conductor having an insulating film formed on its surface. The insulating film may be removed from the end of each of the segment coils. The ends of the two of the segment coils may be electrically connected together by being fitted to both ends of a tubular coupling member, and the conductor-exposed portions may be formed by exposing parts of the ends from the coupling member. Thus, the conductor-exposed portions having necessary and sufficient areas can be arranged with an appropriate distance therebetween on both sides of the connection portion between the ends of the segment coils without removing the insulating films at portions other than the ends of the segment coils.

In the method of the second aspect, the segment coils may include a first segment coil including two legs inserted into the slots different from each other from one end face of the stator core, and a second segment coil including two legs inserted into the slots different from each other from the other end face of the stator core. The end of the first segment coil and the end of the second segment coil may be tips of the two legs. The end of the first segment coil and the end of the second segment coil may be electrically connected together by the coupling member in each of the slots. Thus, the manufacturing costs of the stator can be reduced by suppressing an increase in the number of segment coils or the number of connection portions and saving labor for the step of connecting the segment coils. In addition, the height of the entire stator can be reduced by reducing the heights of the portions of the segment coils that are located on the outer side of the end faces of the stator core.

In the method of the second aspect, the two legs of each of the first segment coil and the second segment coil may be formed to have different lengths. A shorter one of the two legs may be arranged on an inner side in the radial direction with respect to a longer one of the two legs. Thus, it is possible to suppress the occurrence of a case where the probe inserted into the slot from the central hole of the stator cannot be brought into contact with the conductor-exposed portion near the connection portion between the legs arranged on the outer side in the radial direction by being obstructed by the legs arranged on the inner side in the radial direction.

In the method of the second aspect, the coupling member may be attached to the end of one of the first segment coil and the second segment coil before the first segment coil and the second segment coil are inserted into the slots. Thus, the step of connecting the segment coils can be simplified and shortened.

In the method of the second aspect, an insulating member may be arranged in each of the slots before the at least parts of the segment coils are inserted into the slots.

In the method of the second aspect, the segment coils may include a plurality of slot coils, a plurality of first coupling coils, a plurality of second coupling coils, and a plurality of third coupling coils. The slot coils are inserted into the corresponding slots. The first coupling coils each have a first connection hole formed at one end of each of the first coupling coils, and a second connection hole formed at the other end of each of the first coupling coils. The first coupling coils are arranged along an end face of the stator core. The second coupling coils each have a first connection hole formed at one end of each of the second coupling coils, and a second connection hole formed at the other end of each of the second coupling coils. The second coupling coils are arranged on an outer side of the first coupling coils in an axial direction of the stator core. The third coupling coils are each fitted to the second connection hole of each of the first coupling coils and the second connection hole of each of the second coupling coils. The method may include first step of fitting each of the ends of the slot coils included in one of the layers to the first connection hole of a corresponding one of the first coupling coils, fitting each of the third coupling coils to the second connection hole of the corresponding one of the first coupling coils, and measuring electric resistances of a connection portion between each of the slot coils and the corresponding one of the first coupling coils and a connection portion between the corresponding one of the first coupling coils and each of the third coupling coils, second step of fitting each of the ends of the slot coils included in a layer on an inner side of the one of the layers in the radial direction to the first connection hole of a corresponding one of the second coupling coils, fitting each of the third coupling coils to the second connection hole of the corresponding one of the second coupling coils, and measuring electric resistances of a connection portion between each of the slot coils and the corresponding one of the second coupling coils and a connection portion between the corresponding one of the second coupling coils and each of the third coupling coils, and the first step and the second step are executed repeatedly. According to this method as well, in the stator finally obtained by intricately attaching the segment coils to the stator core, the electric resistances can be measured by accessing all the connection portions.

In the method of the second aspect, in the first step, the following surfaces may be used as conductor-exposed portions configured to be brought into contact with probes of a resistance measurement apparatus: an end face of each of the ends of the slot coils fitted to the first connection hole of the corresponding one of the first coupling coils; two parts on a surface of the corresponding one of the first coupling coils, which is opposite to the stator core; and an end face of each of the third coupling coils, which is opposite to the stator core. In the second step, the following surfaces may be used as the conductor-exposed portions: an end face of each of the ends of the slot coils fitted to the first connection hole of the corresponding one of the second coupling coils; two parts on a surface of the corresponding one of the second coupling coils, which is opposite to the stator core; and the end face of each of the third coupling coils, which is opposite to the stator core.

A third aspect of the present disclosure relates to an annular coil. The annular coil includes a plurality of segment coils in which corresponding ends are electrically connected together. At least parts of the segment coils are arranged so as to adjoin each other in a radial direction. The annular coil includes a plurality of layers each including the ends of the segment coils adjacent to each other in a circumferential direction. The layers are arranged in the radial direction. The corresponding ends are electrically connected together via a coupling member or by being fitted together. Each of the segment coils includes a conductor-exposed portion located close to a connection portion between the corresponding segment coils and configured to be brought into contact with a probe of a resistance measurement apparatus.

In this coil, the reliability can further be improved by identifying the connection portion between the segment coils (ends) where the connection failure occurs and eliminating the connection failure in the identified connection portion.

A fourth aspect of the present disclosure relates to a method for manufacturing an annular coil. In the method, the annular coil includes a plurality of segment coils in which corresponding ends are electrically connected together. At least parts of the segment coils are arranged so as to adjoin each other in a radial direction. The annular coil includes a plurality of layers each including the ends of the segment coils adjacent to each other in a circumferential direction. The layers are arranged in the radial direction. The method includes electrically connecting a plurality of the ends included in the same layer to the ends of the other corresponding segment coils and measuring electric resistances of connection portions between the ends included in the same layer, and the connection of the ends and the measurement of the electric resistances are executed for each of the layers.

According to this method, the reliability of the coil can further be improved by identifying the connection portion between the segment coils (ends) where the connection failure occurs and eliminating the connection failure in the identified connection portion.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 12 is an explanatory drawing illustrating a segment coil attachment apparatus to be used for manufacturing the stator according to the first embodiment;

DETAILED DESCRIPTION OF EMBODIMENTS

Embodiments of the disclosure disclosed herein are described with reference to the drawings.

First Embodiment

Figure 1:
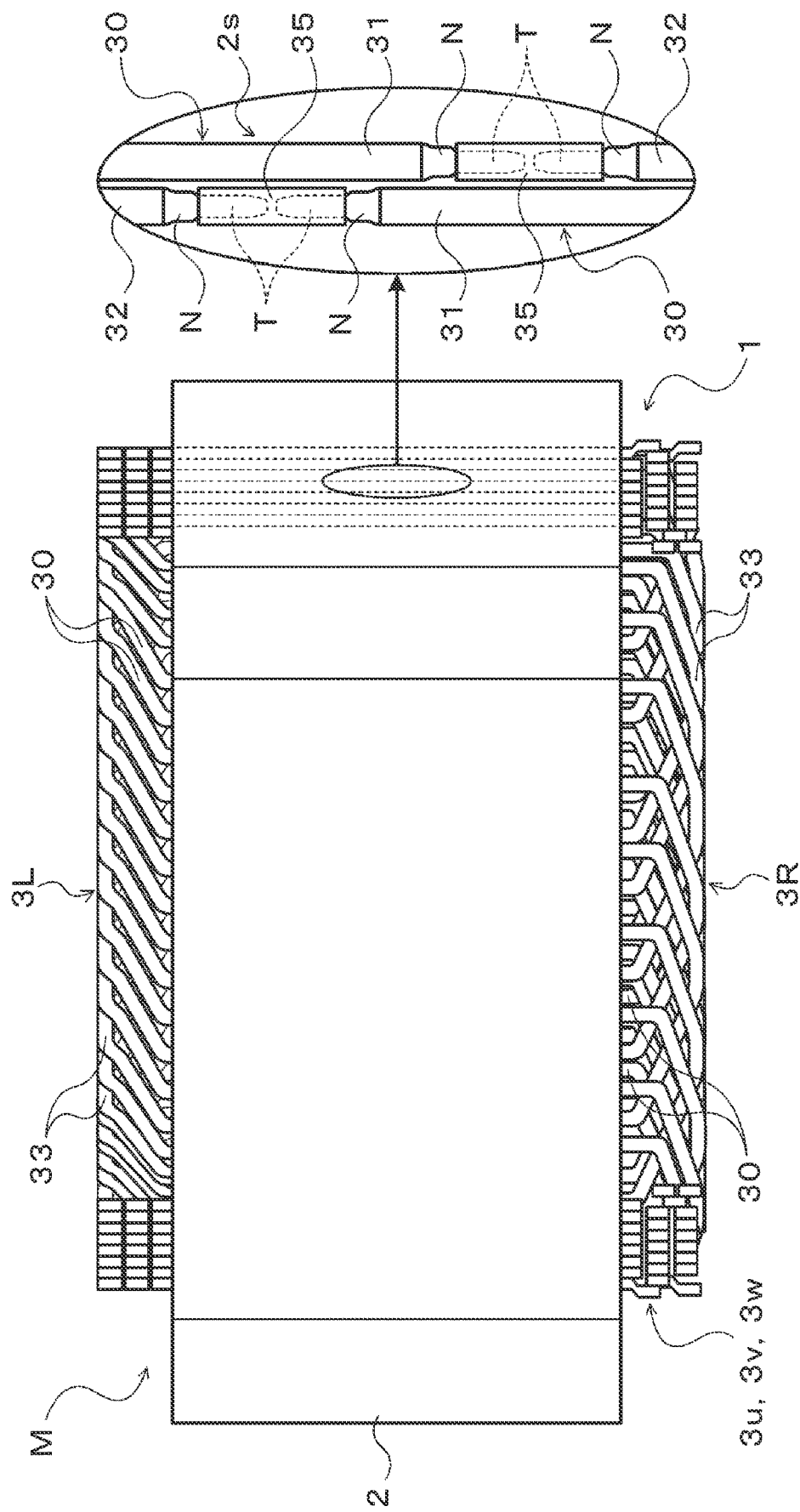
FIG. 1 is an overall structural view illustrating a rotating electrical machine including a stator according to a first embodiment disclosed herein.
Figure 2:
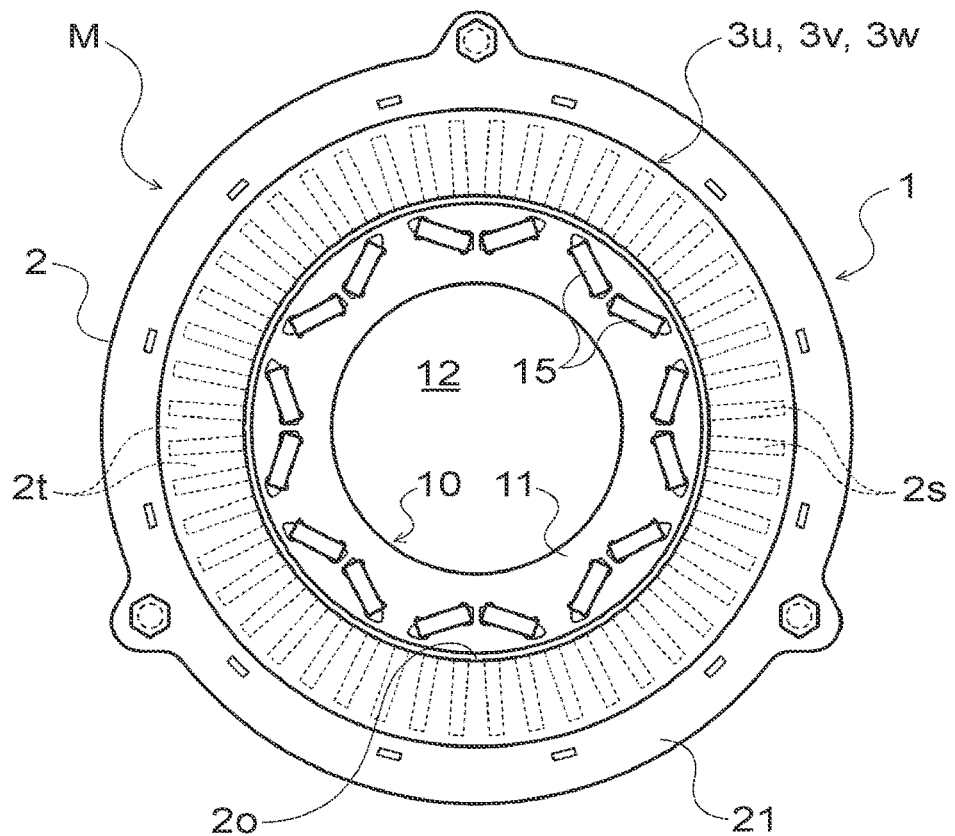
FIG. 2 is a plan illustrating the rotating electrical machine including the stator according to the first embodiment.

FIG. 1 is an overall structural view illustrating a rotating electrical machine M including a stator 1 according to a first embodiment disclosed herein. FIG. 2 is a plan illustrating the rotating electrical machine M. For example, the rotating electrical machine M illustrated in the drawings is a three-phase alternating current motor to be used as a drive source or a generator for an electric vehicle or a hybrid vehicle. As in the illustration, the rotating electrical machine M includes the annular stator 1, and a rotor 10 arranged in the stator 1 via an air gap in a rotatable manner. As illustrated in FIG. 1 and FIG. 2, the stator 1 includes an annular stator core 2, a stator coil 3u (U-phase coil), a stator coil 3v (V-phase coil), and a stator coil 3w (W-phase coil). The rotor 10 of the rotating electrical machine M is a so-called interior permanent magnet (IPM) rotor. As illustrated in FIG. 2, the rotor 10 includes a rotor core 11 fixed to a rotation shaft (not illustrated), and a plurality of (for example, 16 in this embodiment) permanent magnets 15 embedded in the rotor core 11 so as to form a plurality of (for example, eight in this embodiment) magnetic poles.

For example, the stator core 2 of the stator 1 is formed such that a plurality of electromagnetic steel sheets 21 (see FIG. 2) formed substantially into a ring shape by press working are stacked and coupled by clamping in a stacking direction. For example, the stator core 2 may be formed into an annular shape by pressure-molding and sintering ferromagnetic powders. As illustrated in FIG. 2, the stator core 2 includes a central hole 2o, a plurality of teeth 2t, and a plurality of (for example, 48 in this embodiment) slots 2s. The rotor 10 is arranged in the central hole 2o. The teeth 2t extend in a radial direction from an annular outer peripheral portion (yoke) toward an axis (center of the stator core 2), and adjoin each other at predetermined intervals in a circumferential direction. Each of the slots 2s is formed between adjacent teeth 2t. The slots 2s extend in the radial direction of the stator core 2, are arrayed at predetermined intervals in the circumferential direction, and are open to the central hole 2o.

Figure 3:
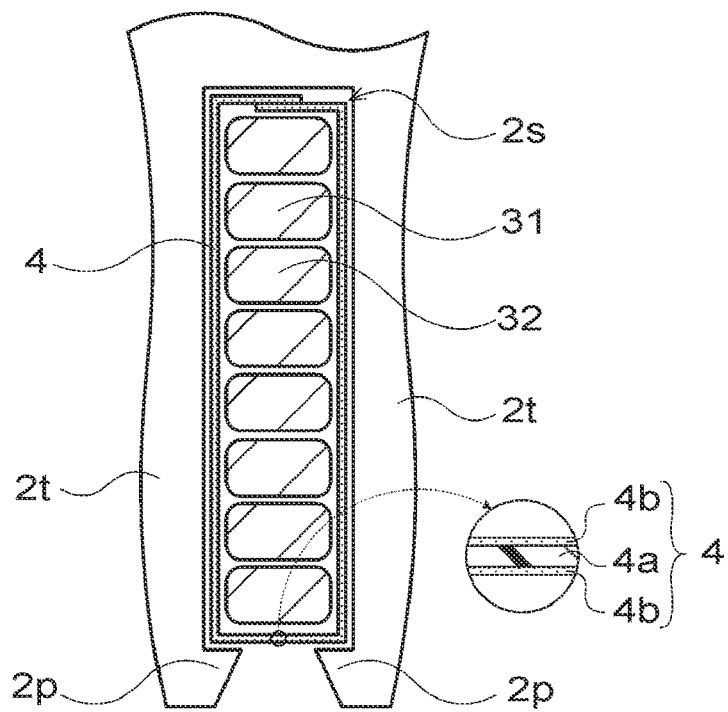
FIG. 3 is an enlarged view illustrating the stator according to the first embodiment.

As illustrated in FIG. 3, an insulator (insulating member) 4 is arranged in each slot 2s of the stator core 2. In this embodiment, the insulator 4 includes a base 4a, and foamed adhesive layers 4b formed on the front surface and the back surface of the base 4a. The base 4a is a sheet made of a resin material having a heat resistance and an insulating property, such as polyphenylene sulfide (PPS), polyethylene naphthalate (PEN), or an epoxy resin. The foamed adhesive layer 4b is made of, for example, an epoxy-based foamed resin material to have an insulating property and adhesiveness. The foamed adhesive layer 4b is expanded by heating and then cured. As illustrated in FIG. 3, the insulator 4 is bent into a rectangular tube shape so that both ends overlap each other in conformity with the sectional shape of each slot 2s, and is inserted into the slot 2s from one end face side of the stator core 2 so that the overlap between both ends is located on, for example, an outer peripheral side (yoke side). In this embodiment, each tooth 2t of the stator core 2 has a protrusion 2p that restricts detachment of the insulator 4 toward the axis through the opening of the slot 2s. The insulator 4 may be formed of nonwoven fabric or the like having an insulating property.

Figure 4:
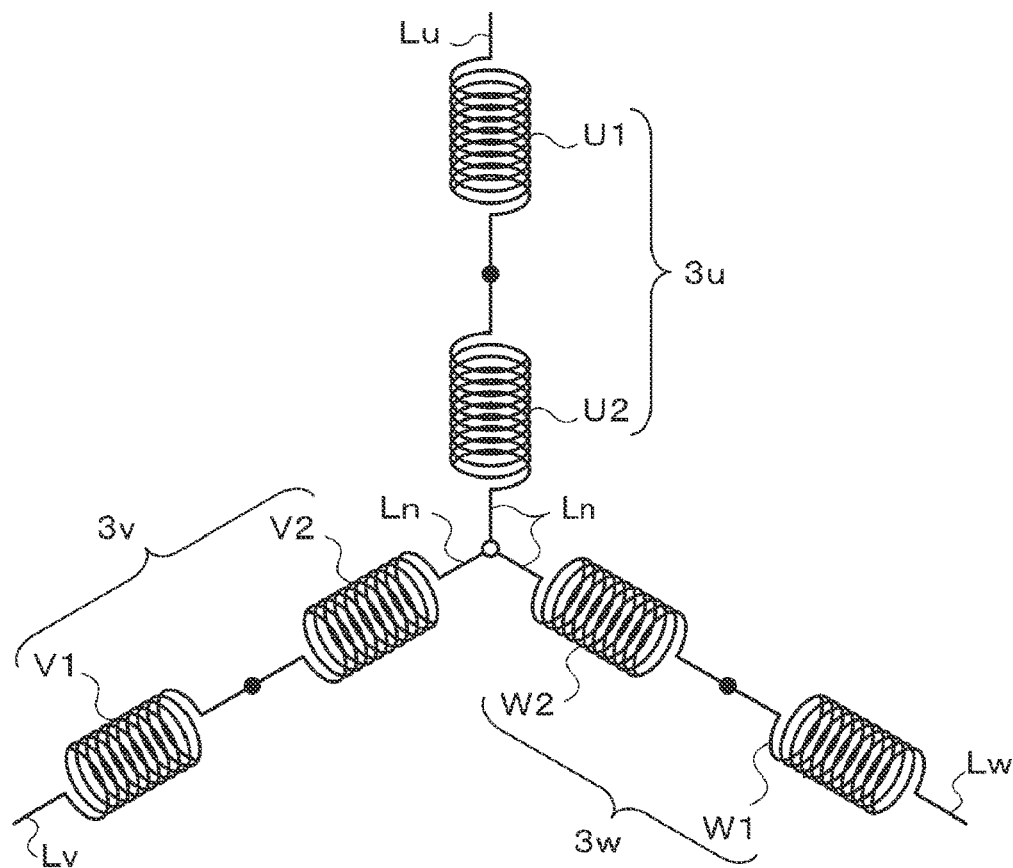
FIG. 4 is a schematic view illustrating stator coils of the stator according to the first embodiment.

As illustrated in FIG. 4, the stator coils 3u, 3v, and 3w are connected by single star connection (1Y connection). In this embodiment, the U-phase stator coil 3u includes a first coil U1 and a second coil U2. The V-phase stator coil 3v includes a first coil V1 and a second coil V2. The W-phase stator coil 3w includes a first coil W1 and a second coil W2. Each first coil U1, V1, or W1 includes a leader line Lu, Lv, or Lw. Each second coil U2, V2, or W2 includes a neutral line Ln.

The leader line Lu of the stator coil 3u is electrically joined to the tip of a U-phase power line (not illustrated) electrically joined to a U-phase terminal (not illustrated). The leader line Lv of the stator coil 3v is electrically joined to the tip of a V-phase power line (not illustrated) electrically joined to a V-phase terminal (not illustrated). The leader line Lw of the stator coil 3w is electrically joined to the tip of a W-phase power line (not illustrated) electrically joined to a W-phase terminal (not illustrated). When the stator 1 is attached to a housing of the rotating electrical machine M, the U-phase terminal, the V-phase terminal, and the W-phase terminal are fixed to a terminal block (not illustrated) arranged in the housing, and are connected to an inverter (not illustrated) via electric power lines (not illustrated).

Figure 5:
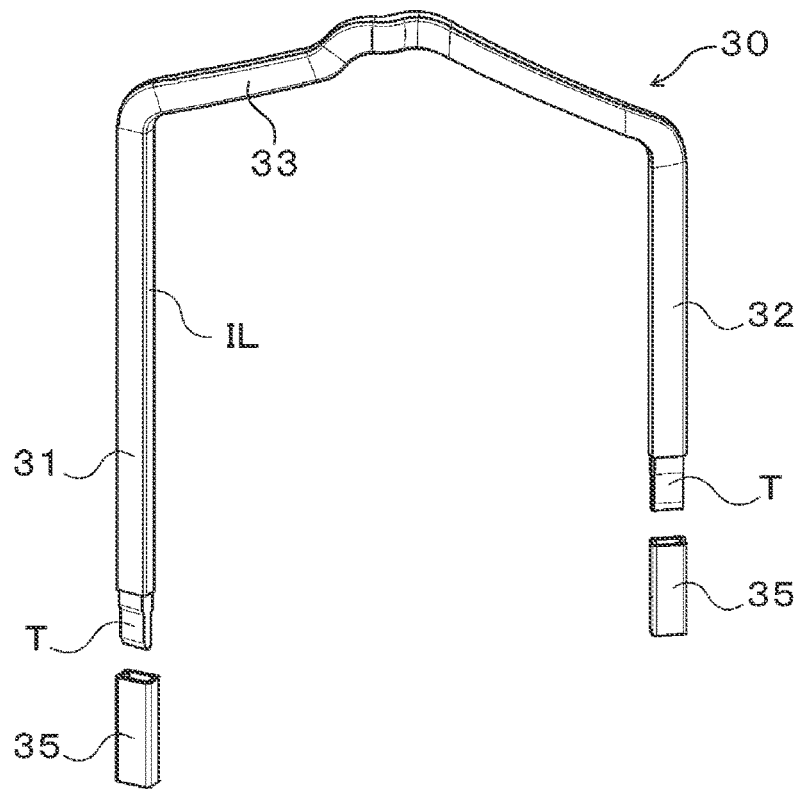
FIG. 5 is a perspective view illustrating a segment coil that forms the stator coil of the stator according to the first embodiment.

Each of the stator coils 3*u*, 3*v*, and 3*w* is formed by electrically connecting pluralities of segment coils 30, 30*i*, and 30*o* inserted into the slots 2*s* of the stator core 2. Each of the segment coils 30, 30*i*, and 30*o* is formed such that a flat rectangular wire (conductor) having an insulating film IL formed on its surface from, for example, an enamel resin is bent substantially into a U-shape. As illustrated in FIG. 5, the segment coil 30 includes two legs 31 and 32 and a connecting wire 33. Each of the legs 31 and 32 linearly extends, and has a tip T where the conductor is exposed by removing the insulating film IL. The connecting wire 33 connects the legs 31 and 32. In the segment coil 30, the leg 31 is longer than the leg 32. In this embodiment, each of the stator coils 3*u*, 3*v*, and 3*w* includes pluralities (for example, seven types in this embodiment) of segment coils 30 different in terms of, for example, the distance between the legs 31 and 32.

In some of the segment coils 30, the legs 31 and 32 are inserted into different slots 2*s* from one end face, that is, an inverse lead-side end face of the stator core 2 (lower side in FIG. 1). In the remaining segment coils 30, the legs 31 and 32 are inserted into different slots 2*s* from the other end face, that is, a lead-side end face of the stator core 2 (upper side in FIG. 1). In this embodiment, if one of the legs 31 and 32 of the segment coil 30 is inserted into an i-th slot 2*s*, the other is inserted into an (i+m−1)th slot 2*s* (except for a segment coil 30' (see FIG. 8) at the terminal end of the first coil U1, V1, or W1). In this embodiment, "i" is an integer from 1 to 48 (total slot count), and "m" is 6 (total number of first and second coils U1 to W2).

Figure 6:
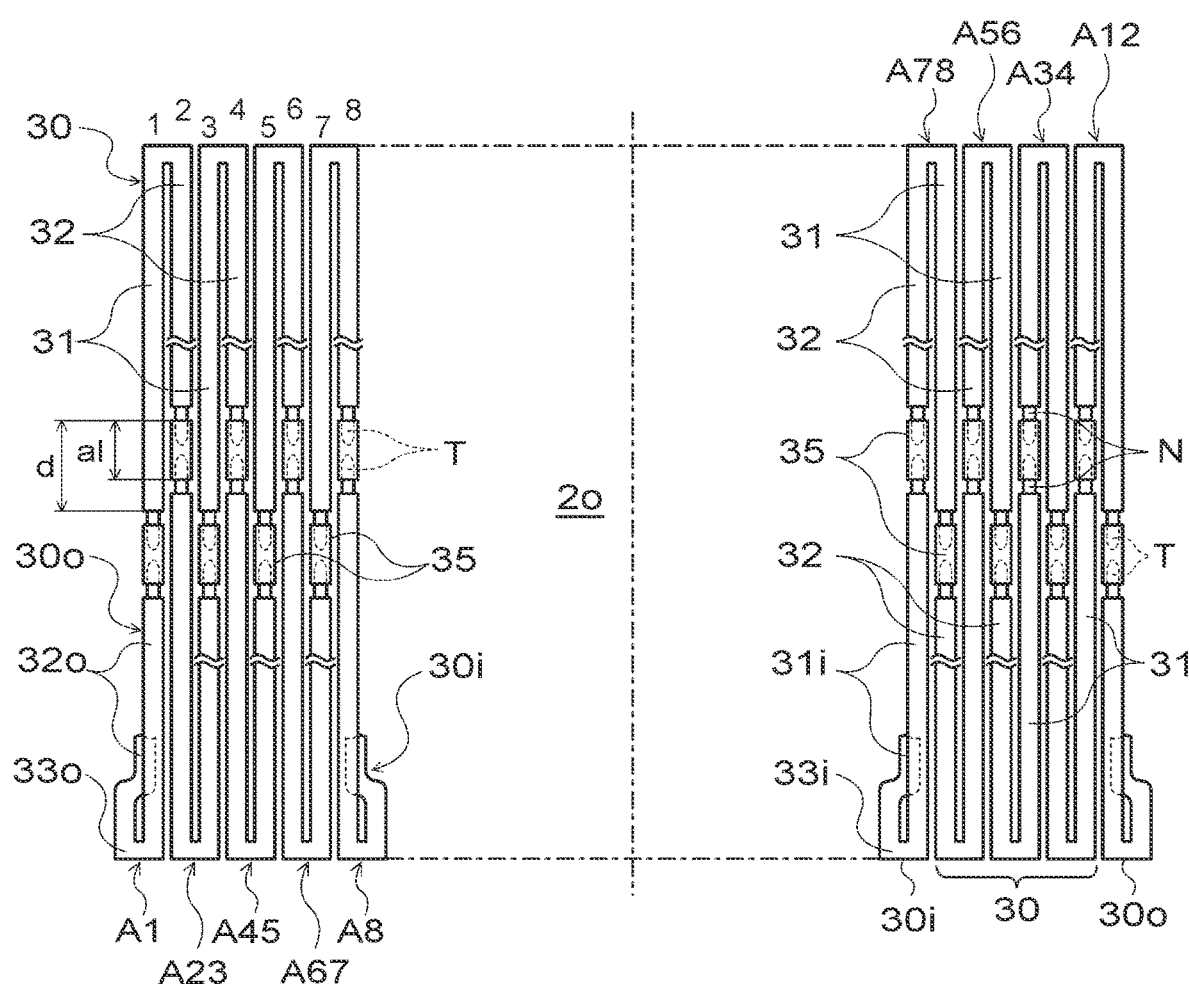
FIG. 6 is an overall structural view illustrating the stator coil of the stator according to the first embodiment.

As illustrated in FIG. 6, the segment coil 30*i* includes two legs 31*i* and a connecting wire 33*i*. Each leg 31*i* linearly extends, and has a tip T where the conductor is exposed by removing the insulating film IL. The connecting wire 33*i* connects the legs 31*i*. In the segment coil 30*i*, the legs 31*i* have substantially the same length, and also have substantially the same length as that of the leg 31 of the segment coil 30. The legs 31*i* of each segment coil 30*i* are inserted into different slots 2*s* at portions closest to the central hole 2*o* (innermost layer) from the inverse lead-side end face of the stator core 2. In this embodiment, if one leg 31*i* of the segment coil 30*i* is inserted into an i-th slot 2*s*, the other is inserted into an (i+m+1)th slot 2*s*.

As illustrated in FIG. 6, the segment coil 30*o* includes two legs 32*o* and a connecting wire 33*o*. Each leg 32*o* linearly extends, and has a tip T where the conductor is exposed by removing the insulating film IL. The connecting wire 33*o* connects the legs 32*o*. In the segment coil 30*o*, the legs 32*o* have substantially the same length, and also have substantially the same length as that of the leg 32 of the segment coil 30. The legs 32*o* of each segment coil 30*o* are inserted into different slots 2*s* at outermost portions (outermost layer) from the inverse lead-side end face of the stator core 2. In this embodiment, if one leg 32*o* of the segment coil 30*o* is inserted into an i-th slot 2*s*, the other is inserted into an (i+m−1)th slot 2*s*.

The pluralities of segment coils 30, 30*i*, and 30*o* are attached to the stator core 2 so that the legs 31, 31*i*, 32, and 32*o* adjoin each other in the radial direction in each of the plurality of slots 2*s*. Thus, the stator 1 has a plurality of (for example, eight in this embodiment) layers formed in the radial direction, each including the tips T of the segment coils 30, 30*i*, and 30*o* (legs 31, 31*i*, 32, and 32*o*) adjacent to each other in the circumferential direction. A layer including outermost tips T (legs 31 and 32*o*) is hereinafter referred to as "first layer". Layers on an inner side in the radial direction are hereinafter referred to as "second layer", "third layer" . . . in this order. A layer including innermost tips T (legs 31*i* and 32) is hereinafter referred to as "eighth layer".

Figure 7:
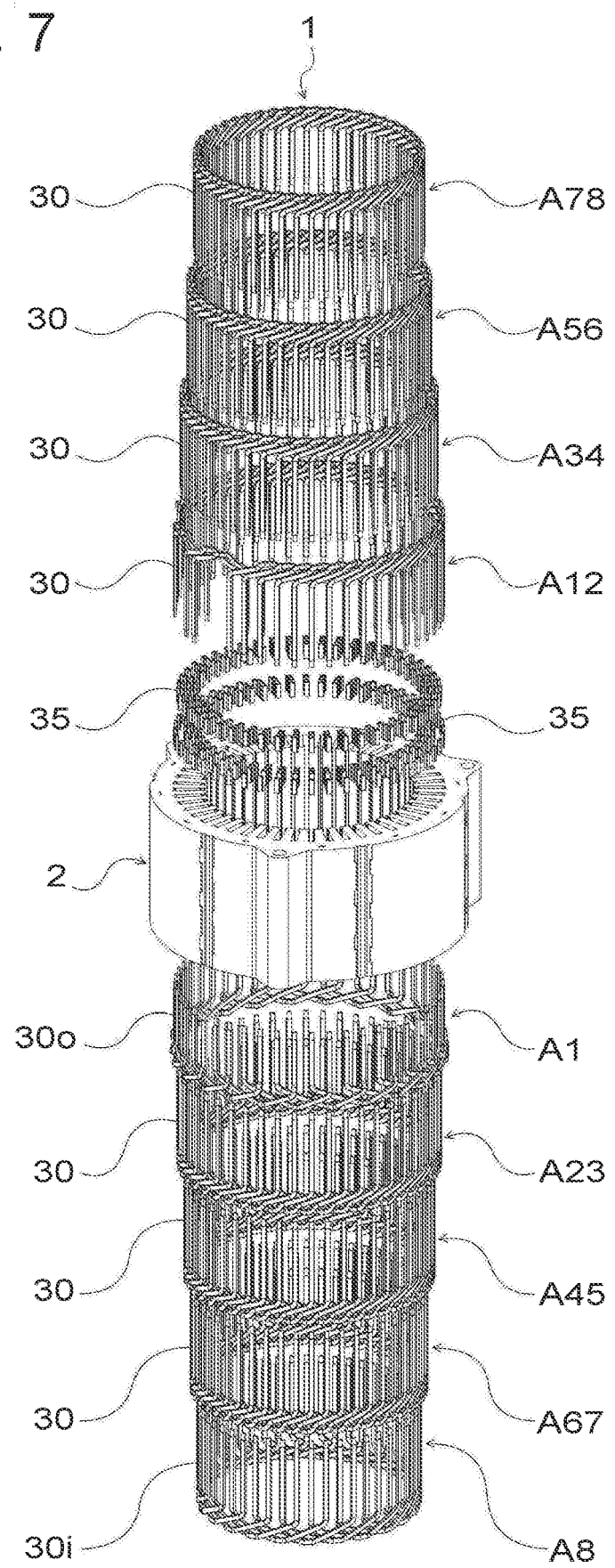
FIG. 7 is an exploded perspective view illustrating the stator according to the first embodiment.

For attachment to the stator core 2, the plurality of segment coils 30 are assembled into an annular shape so that adjacent connecting wires 33 overlap each other in the radial direction while being shifted in the circumferential direction, the tips T of the plurality of legs 31 adjoin each other in the circumferential direction, the legs 32 overlap corresponding legs 31 on an inner side in the radial direction, and the tips T of the plurality of legs 32 adjoin each other in the circumferential direction. In this embodiment, as illustrated in FIG. 6 and FIG. 7, assemblies of the segment coils 30 include a plurality of (seven) coil assemblies A12, A23, A34, A45, A56, A67, and A78 having different bore diameters and different outside diameters depending on, for example, the distance between the legs 31 and 32. As illustrated in FIG. 6 and FIG. 7, the coil assembly A45 is arranged on an inner side of the coil assembly A23, and the coil assembly A67 is arranged on an inner side of the coil assembly A45. As illustrated in FIG. 6 and FIG. 7, the coil assembly A34 is coaxially arranged on an inner side of the coil assembly A12, the coil assembly A56 is coaxially arranged on an inner side of the coil assembly A34, and the coil assembly A78 is coaxially arranged on an inner side of the coil assembly A56.

For attachment to the stator core 2, the plurality of (for example, 24 in this embodiment) segment coils 30*i* are assembled into an annular shape so that adjacent connecting wires 33*i* overlap each other in the radial direction while being shifted in the circumferential direction and the tips T of the plurality of legs 31*i* adjoin each other in the circumferential direction. Thus, the plurality of segment coils 30*i* form a coil assembly A8 (see FIG. 6 and FIG. 7). The coil assembly A8 has an outside diameter slightly smaller than the bore diameter of the coil assembly A67, and is coaxially arranged on an inner side of the coil assembly A67 as illustrated in FIG. 6 and FIG. 7.

For attachment to the stator core 2, the plurality of (for example, 24 in this embodiment) segment coils 30*o* are assembled into an annular shape so that adjacent connecting wires 33*o* overlap each other in the radial direction while being shifted in the circumferential direction and the tips T of the plurality of legs 32*o* adjoin each other in the circumferential direction. Thus, the plurality of segment coils 30*o* form a coil assembly A1 (see FIG. 6 and FIG. 7). The coil assembly A1 has a bore diameter slightly larger than the outside diameter of the coil assembly A23, and is coaxially arranged on an outer side of the coil assembly A23 as illustrated in FIG. 6 and FIG. 7.

As illustrated in FIG. 6 and FIG. 7, the coil assemblies A1, A23, A45, A67, and A8 are sequentially attached to the stator core 2 from the inverse lead-side end face of the stator core 2 (lower side in FIG. 7). Thus, the legs 31, 31*i*, 32, and 32*o* of the segment coils 30, 30*i*, and 30*o* of the coil assemblies A1 to A8 are inserted into corresponding slots 2*s*. As can be understood from FIG. 6, the leg 32 of each segment coil 30 on the inverse lead side (lower side in FIG. 6) is included in a layer (third, fifth, or seventh layer) on an immediately inner side of a layer (second, fourth, or sixth layer) including the leg 31 connected via the connecting wire 33. The connecting wires 33, 33*i*, and 33*o* of the segment coils 30, 30*i*, and 30*o* included in the coil assemblies A1 to A8 protrude outward (downward FIG. 1) from the inverse lead-side end face of the stator core 2 to form an annular coil end 3R.

The coil assemblies A12, A34, A56, and A78 are sequentially attached to the stator core 2 from the lead-side end face of the stator core 2 (upper side in FIG. 7). Thus, the legs 31 and 32 of the segment coils 30 of the coil assemblies A12 to A78 are inserted into corresponding slots 2s. As can be understood from FIG. 6, the leg 32 of each segment coil 30 on the lead side (upper side in FIG. 6) is included in a layer (second, fourth, sixth, or eighth layer) on an immediately inner side of a layer (first, third, fifth, or seventh layer) including the leg 31 connected via the connecting wire 33. The connecting wires 33 of the segment coils 30 included in the coil assemblies A12 to A78 protrude outward (upward in FIG. 1) from the lead-side end face of the stator core 2 to form an annular coil end 3L.

Figure 8:
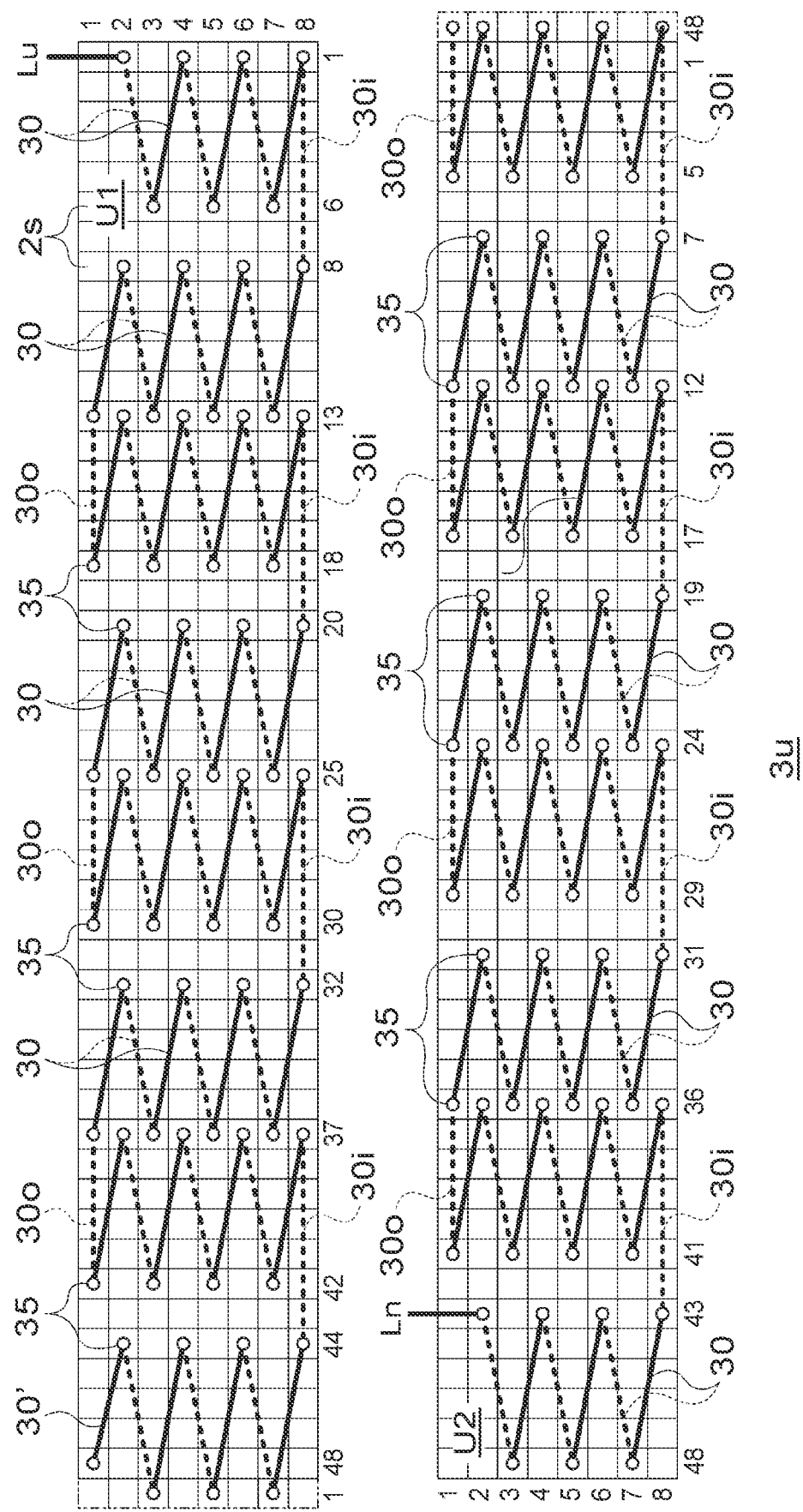
FIG. 8 is an explanatory drawing illustrating how the segment coils are attached to the stator core in the stator according to the first embodiment.

As illustrated in FIG. 1 and FIG. 6, the tip T of the leg 31, 31i, 32, or 32o inserted into the corresponding slot 2s faces the tip T of the leg 31 or 32 inserted into the slot 2s from an opposite side. The tips T that face each other are electrically connected by a coupling member 35 in the slot 2s. By connecting the tips T of the corresponding segment coils 30, 30i, and 30o, the first and second coils U1 and U2 of the stator coil 3u are wound around the stator core 2 while being shifted in the circumferential direction by an amount corresponding to one slot as illustrated in FIG. 8. In FIG. 8, continuous lines represent the segment coils 30 attached to the stator core 2 from the lead-side end face, and dashed lines represent the segment coils 30, 30i, and 30o attached to the stator core 2 from the inverse lead side.

As illustrated in FIG. 8, the leader line Lu is electrically connected to the tip T of a leg 31 at the starting end of the first coil U1 (leg 31 inserted into a first slot 2s from the inverse lead side and provided in a segment coil 30 included in the second layer). As illustrated in FIG. 8, the terminal end of the first coil U1 is formed by a leg 31 of the segment coil 30' included in the coil assembly A12. The leg 31 of the segment coil 30' is inserted into a slot 2s (first layer of a 48th slot 2s) located immediately on a rear side as compared to the legs 31 of the other segment coils 30 included in the coil assembly A12, and is electrically connected to a leg 32o of a segment coil 30o at the starting end of the second coil U2. The neutral line Ln is electrically connected to the tip T of a leg 31 at the terminal end of the second coil U2 (leg 31 inserted into a 43rd slot 2s from the inverse lead side and provided in a segment coil 30 included in the second layer). Thus, the first coil U1 and the second coil U2 are electrically connected together, and the stator coil 3u is wound around the stator core 2 by distributed winding.

Although illustration is omitted, the first coil V1 of the stator coil 3v is wound opposite to the first coil U1 of the stator coil 3u across the second coil U2 while being shifted in the circumferential direction by an amount corresponding to one slot. The second coil V2 of the stator coil 3v is wound opposite to the second coil U2 of the stator coil 3u across the first coil V1 while being shifted in the circumferential direction by an amount corresponding to one slot, and is electrically connected to the first coil V1. The first coil W1 of the stator coil 3w is wound opposite to the first coil V1 of the stator coil 3v across the second coil V2 while being shifted in the circumferential direction by an amount corresponding to one slot. The second coil W2 of the stator coil 3w is wound opposite to the second coil V2 of the stator coil 3v across the first coil W1 while being shifted in the circumferential direction by an amount corresponding to one slot, and is electrically connected to the first coil W1. Thus, the stator coils 3v and 3w are wound around the stator core 2 by distributed winding.

Figure 9:
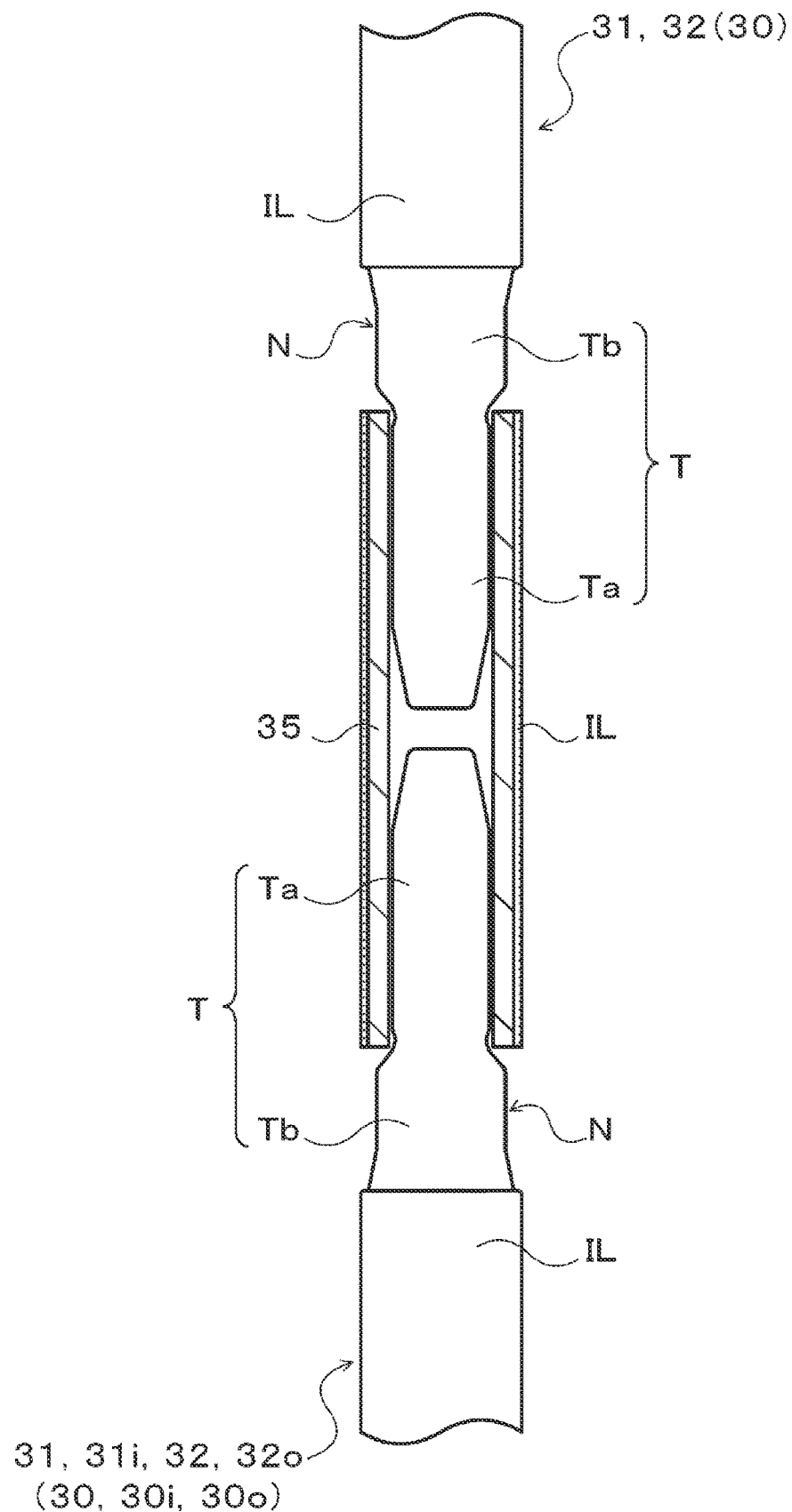
FIG. 9 is an enlarged local sectional view illustrating a connection structure between the segment coils in the stator according to the first embodiment.

FIG. 9 is an enlarged local sectional view illustrating a connection portion between the tips T of the segment coils 30, 30i, and 30o in the stator 1. As illustrated in FIG. 9, the coupling member 35 is a tube where the tips T are fitted into both ends. In this embodiment, the coupling member 35 is formed into a rectangular tube shape having a rectangular hole in cross section by a conductor having the insulating film IL formed on its surface from, for example, an enamel resin. The tip T of each of the segment coils 30, 30i, and 30o includes a thin portion Ta on a distal side, and a thick portion Tb formed between the thin portion Ta and the end of the insulating film IL. The thin portion Ta is securely fitted to an opening at the end of the coupling member 35. The tip of the thin portion Ta is chamfered. The thick portion Tb is formed thicker than the thin portion Ta and the opening width of the coupling member 35 in a short-side direction of the flat rectangular wire so that the thick portion Tb is not fitted into the end of the coupling member 35. The length of the thick portion Tb is set sufficiently larger than the outside diameter of a probe 144 of a resistance measurement apparatus 140 (see FIG. 12) to be used when the stator 1 is manufactured.

When the thin portions Ta of the tips T without the insulating films IL are fitted into both ends of the coupling member 35, the two thin portions Ta, that is, the two corresponding legs 31 and 32 or the like are electrically coupled together. The thick portions (conductors) Tb of the tips T cannot be fitted into the ends of the coupling member 35, and are exposed to the outside of the coupling member 35. That is, the thick portions Tb are exposed from the coupling member 35 when the tips T of the two corresponding segment coils 30, 30i, and 30o (legs 31 and 32 or the like) are connected together in the stator 1. Thus, conductor-exposed portions (bare conductors) N to be brought into contact with the probes 144 of the resistance measurement apparatus 140 are arranged close to both sides of the coupling member 35 that forms the connection portion between the two tips T.

By bringing the pair of probes 144 of the resistance measurement apparatus 140 into contact with the two conductor-exposed portions N close to (adjacent to) the coupling member 35 covered with the insulating film IL, the electric resistances of the connection portions between the two thin portions Ta and the coupling member 35 can be measured accurately. By exposing the thick portions Tb, which are parts of the tips T without the insulating films IL, from the coupling member 35 to the outside, the conductor-exposed portions N having necessary and sufficient areas can be arranged with an appropriate distance therebetween on both sides of the connection portion between the tips T of the two segment coils 30 or the like, that is, the coupling member 35 without removing the insulating films IL at portions other than the tips T. By forming the thin portions Ta and the thick portions Tb in the tips T of the segment coils 30 or the like, the conductor-exposed portions N can be formed securely on both sides of the coupling member 35 that forms the connection portion between the tips T. In this embodiment, an axial length al of the coupling member 35 is set equal to or smaller than a distance d (distance in an axial direction of the stator core 2) between the end of the conductor-exposed portion N (thick portion Tb) of the leg 31 that is closer to the insulating film IL (boundary with the insulating film IL) and the end of the conductor-exposed portion N (thick portion Tb) of the leg 32 that is opposite to the insulating film IL (boundary with the thin portion Ta) (see FIG. 6).

Figure 10:
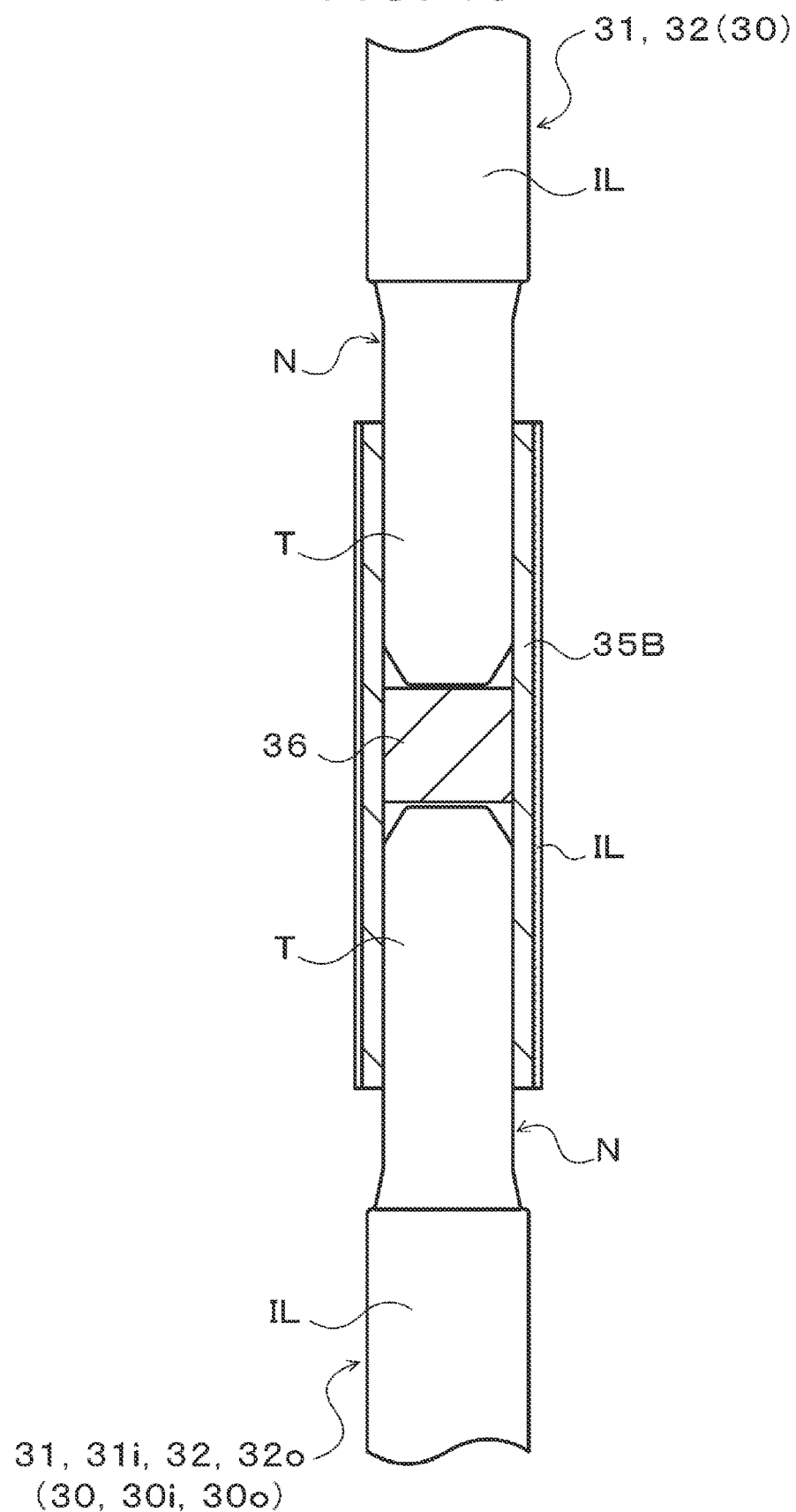
FIG. 10 is an enlarged local sectional view illustrating another example of the connection structure between the segment coils.

In the stator 1, the thin portion Ta and the thick portion Tb may be omitted from the tip T of the segment coil 30 or the like, and the two tips T may be connected by a coupling member 35B illustrated in FIG. 10. In the example of FIG. 10, the tip T of the segment coil 30 or the like has a substantially uniform sectional shape except for the distal chamfered portion, and is securely fitted to an opening at the end of the coupling member 35B. The coupling member 35B is formed into a rectangular tube shape having a rectangular hole in cross section by a conductor having the insulating film IL formed on its surface from, for example, an enamel resin. An entry restriction member 36 formed by a conductor is arranged at the center of the hole in a longitudinal direction. The dimensions of the entry restriction member 36 are set in consideration of, for example, the length of the coupling member 35B and the outside diameter of the probe 144 of the resistance measurement apparatus 140.

When the tips T without the insulating films IL are fitted into both ends of the coupling member 35B, the two tips T, that is, the two legs 31 and 32 or the like are electrically coupled together. The end faces of the tips T fitted into the coupling member 35B abut against the entry restriction member 36, thereby restricting further entry of the tips T into the coupling member 35B. As a result, as illustrated in FIG. 10, parts of the tips T without the insulating films IL are exposed to the outside of the coupling member 35B without entering the coupling member 35B. That is, in the example of FIG. 10, parts of the tips T of the two corresponding segment coils 30 or the like (legs 31 and 32 or the like) are exposed from the coupling member 35B covered with the insulating film IL when the tips T are connected together. Thus, the conductor-exposed portions N to be brought into contact with the probes 144 of the resistance measurement apparatus 140 are arranged close to both sides of the coupling member 35B that forms the connection portion between the two tips T.

Thus, the conductor-exposed portions N can be formed securely on both sides of the coupling member 35B that forms the connection portion between the tips T. By bringing the pair of probes 144 of the resistance measurement apparatus 140 into contact with the two conductor-exposed portions N close to (adjacent to) the coupling member 35B, the electric resistances of the connection portions between the two tips T and the coupling member 35B can be measured accurately. By exposing parts of the tips T from the coupling member 35B to the outside, the conductor-exposed portions N having necessary and sufficient areas can be arranged with an appropriate distance therebetween on both sides of the connection portion between the tips T of the two segment coils 30 or the like, that is, the coupling member 35B without removing the insulating films IL at portions other than the tips T. It is appropriate that an axial length al of the coupling member 35B be also set equal to or smaller than the distance d (distance in the axial direction of the stator core 2) between the end of the conductor-exposed portion N of the leg 31 that is closer to the insulating film IL (boundary with the insulating film IL) and the end of the conductor-exposed portion N of the leg 32 that is opposite to the insulating film IL.

Figure 11:
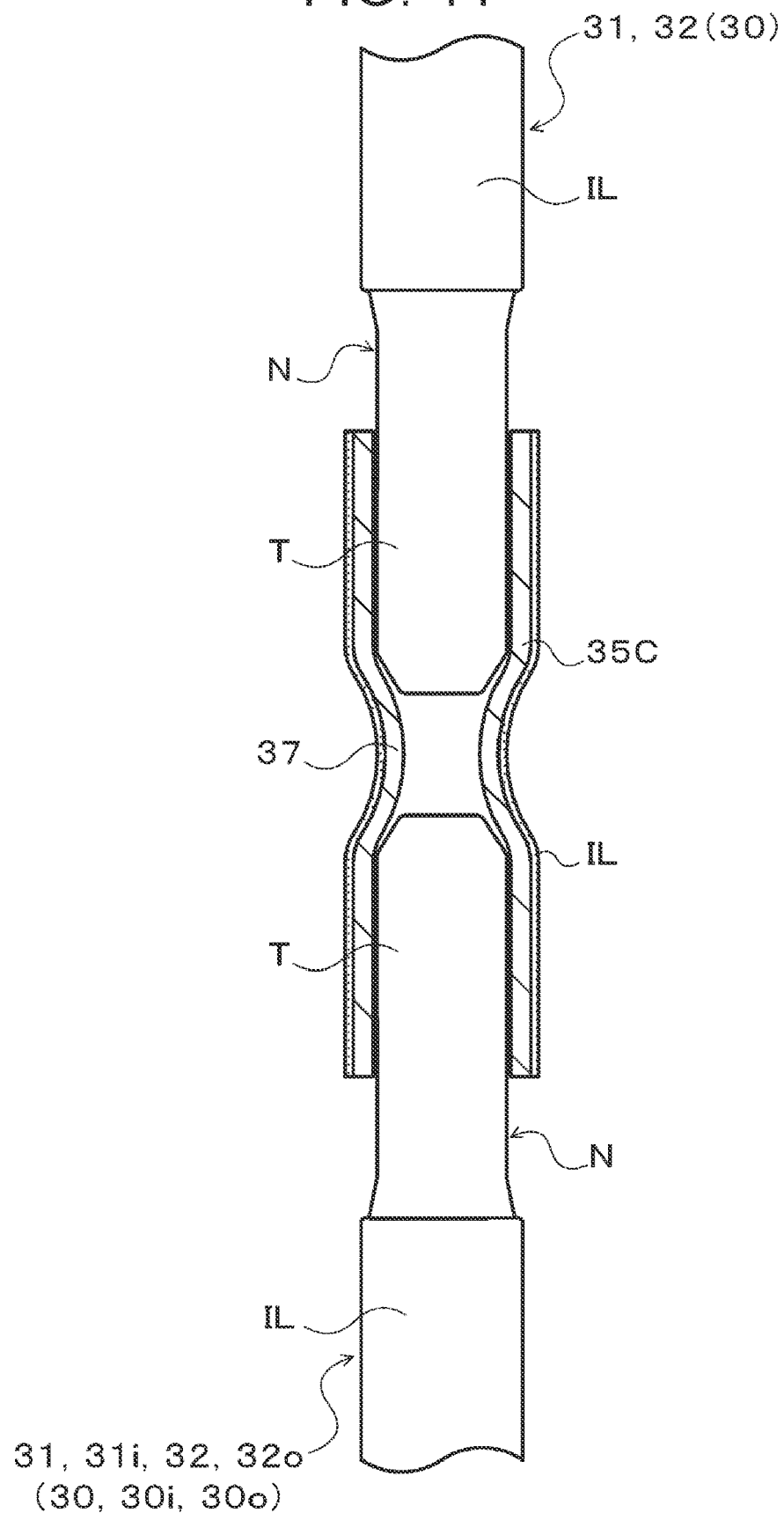
FIG. 11 is an enlarged local sectional view illustrating still another example of the connection structure between the segment coils.

In the stator 1, a coupling member 35C illustrated in FIG. 11 may be employed. The coupling member 35C is a tubular conductor having the insulating film IL formed on its surface, and includes an entry restriction protrusion 37 that protrudes toward an axis from an outer peripheral side at the center in a longitudinal direction. For example, the entry restriction protrusion 37 is formed by depressing, toward the axis, the entire periphery of the center of the coupling member 35C in the longitudinal direction or a plurality of portions in a circumferential direction. When the tips T without the insulating films IL are fitted into both ends of the coupling member 35C, the end faces of the tips T abut against the entry restriction protrusion 37, thereby restricting further entry of the tips T into the coupling member 35C. As a result, as illustrated in FIG. 11, parts of the tips T without the insulating films IL are exposed from the coupling member 35C covered with the insulating film IL. Thus, the conductor-exposed portions N can be formed securely on both sides of the coupling member 35C that forms the connection portion between the tips T. It is appropriate that an axial length al of the coupling member 35C be also set equal to or smaller than the distance d (distance in the axial direction of the stator core 2) between the end of the conductor-exposed portion N of the leg 31 that is closer to the insulating film IL (boundary with the insulating film IL) and the end of the conductor-exposed portion N of the leg 32 that is opposite to the insulating film IL.

FIG. 12 is an explanatory drawing illustrating a segment coil attachment apparatus 100 configured to attach the pluralities of segment coils 30, 30i, and 30o to the stator core 2. The segment coil attachment apparatus 100 (hereinafter referred to as "attachment apparatus 100" as appropriate) includes a support portion (not illustrated) that supports the stator core 2, a coil assembly raising apparatus 110 (hereinafter referred to as "raising apparatus 110" as appropriate) arranged below the support portion, a coil assembly lowering apparatus 120 (hereinafter referred to as "lowering apparatus 120" as appropriate) arranged above the support portion, a tip position adjustment apparatus 130, the resistance measurement apparatus 140, and a controller 150 that is a computer including a central processing unit (CPU), a read-only memory (ROM), and a random-access memory (RAM) (not illustrated). The support portion of the attachment apparatus 100 supports the stator core 2 in a non-rotatable manner so as not to close the central hole 2o and the openings of all the slots 2s on the lead side and the inverse lead side.

The raising apparatus 110 includes a plurality of (for example, five in this embodiment) raising members P1, P23, P45, P67, and P8, and a movement mechanism (not illustrated) configured to move the raising members P1 to P8 in the axial direction of the stator core 2 supported by the support portion. The raising members P1, P23, P45, P67, and P8 are annular members having different bore diameters and different outside diameters, and are concentrically arranged so as to push the corresponding coil assemblies A1, A23, A45, A67, and A8. The movement mechanism of the raising apparatus 110 is controlled by the controller 150 to individually move (advance or retreat) the raising members P1, P23, P45, P67, and P8 closer to or away from the stator core 2 supported by the support portion.

The lowering apparatus 120 includes a plurality of (for example, four in this embodiment) lowering members P12, P34, P56, and P78, and a movement mechanism (not illustrated) configured to move the lowering members P12 to P78 in the axial direction of the stator core 2 supported by the support portion. The lowering members P12, P34, P56, and P78 are annular members having different bore diameters and different outside diameters, and are concentrically and coaxially arranged so as to push the corresponding coil assemblies A12, A34, A56, and A78. The movement mechanism of the lowering apparatus 120 is controlled by the controller 150 to individually move (advance or retreat) the lowering members P12, P34, P56, and P78 closer to or away from the stator core 2 supported by the support portion.

The tip position adjustment apparatus 130 includes a movement member 131 and a plurality of movable arms 132. The movement member 131 is arranged coaxially with the stator core 2 supported by the support portion, and is advanceable or retreatable (vertically movable) in the axial direction of the stator core 2. The movable arms 132 are provided as many as the slots 2s of the stator core 2 (for example, 48 movable arms 132 are provided in this embodiment). The movement member 131 is inserted into or retreated from the central hole 2o of the stator core 2 by a driver (not illustrated) controlled by the controller 150. Each movable arm 132 is insertable into the slot 2s of the stator core 2, and engagement claws 133 are formed at the tip of the movable arm 132 to protrude upward and downward. The movable arms 132 are arrayed so as to protrude radially from the movement member 131, and are supported by the movement member 131 so as to be movable in the radial direction of the stator core 2. The movement member 131 includes an arm movement mechanism (not illustrated) to be controlled by the controller 150. The arm movement mechanism includes a drive motor and a cam mechanism, and can collectively insert the movable arms 132 into the corresponding slots 2s of the stator core 2 or collectively remove the movable arms 132 from the slots 2s.

The resistance measurement apparatus 140 includes a movement member 141, a plurality of (for example, two in this embodiment) movable arms 142, and probe heads 143. The movement member 141 is arranged in a rotatable manner coaxially with the stator core 2 supported by the support portion, and is advanceable or retreatable (vertically movable) in the axial direction of the stator core 2. The probe heads 143 are fixed to the tips of the movable arms 142. The movement member 141 is inserted into or retreated from the central hole 2o of the stator core 2 by a driver (not illustrated) controlled by the controller 150. The driver can rotate the movement member 141 in the central hole 2o about the axis of the stator core 2.

Each movable arm 142 and each probe head 143 are insertable into the slot 2s of the stator core 2. The movable arms 142 are supported by the movement member 141 so as to be movable in the radial direction of the stator core 2, and protrude in opposite directions from the movement member 141. The movement member 141 includes an arm movement mechanism (not illustrated) to be controlled by the controller 150. The arm movement mechanism includes a drive motor and a cam mechanism, and can collectively insert the pluralities (pairs) of movable arms 142 and probe heads 143 into two slots 2s of the stator core 2 that face each other or collectively remove the movable arms 142 and the like from the slots 2s. Each probe head 143 holds the pair of probes 144 connected to a resistance measurement unit 145 to be controlled by the controller 150. The resistance measurement unit 145 measures the electric resistances of target portions by causing a current to flow through the probes 144, and transmits a signal indicating a measurement value to the controller 150.

Next, description is given of a procedure of manufacturing the stator 1, more specifically, a procedure of attaching the pluralities of segment coils 30, 30i, and 30o to the stator core 2 and winding the stator coils 3u, 3v, and 3w around the stator core 2 by using the segment coil attachment apparatus 100.

When the attachment apparatus 100 attaches the pluralities of segment coils 30, 30i, and 30o to the stator core 2, the raising members P1 to P8 of the raising apparatus 110 are lowered to initial positions illustrated in FIG. 12, and the lowering members P12 to P78 of the lowering apparatus 120 are raised to initial positions illustrated in FIG. 12. The support portion of the attachment apparatus 100 supports the stator core 2 having the insulators 4 arranged in all the slots 2s. The movement member 131 of the tip position adjustment apparatus 130 is retreated to an initial position between the raising apparatus 110 and the support portion. The movement member 141 of the resistance measurement apparatus 140 is retreated to an initial position farthest upward from the support portion.

As illustrated in FIG. 12, the coil assemblies A1, A23, A45, A67, and A8 are set concentrically on the raising apparatus 110 so that the tips T of the segment coils 30, 30i, and 30o (legs 31, 31i, 32, and 32o) face the corresponding slots 2s of the stator core 2. The bottoms of the coil assemblies A1 to A8, that is, the connecting wires 33, 33i, and 33o of the segment coils 30, 30i, and 30o are supported by the corresponding raising members P1 to P8. As illustrated in FIG. 12, the coil assemblies A12, A34, A56, and A78 are set concentrically on the lowering apparatus 120 so that the tips T of the segment coils 30 (legs 31 and 32) face the corresponding slots 2s of the stator core 2. The tops of the coil assemblies A12 to A78, that is, the connecting wires 33 of the segment coils 30 abut against the corresponding lowering members P12 to P78.

In this embodiment, as illustrated in FIG. 12, the coupling members 35 are attached (fitted) to all the tips T of the segment coils 30, 30i, and 30o (legs 31, 31i, 32, and 32o) of the coil assemblies A1, A23, A45, A67, and A8 before the coil assemblies A1, A23, A45, A67, and A8 are set on the raising apparatus 110. Thus, the thick portions Tb of the tips T are exposed from the coupling members 35 (see FIG. 9), and the conductor-exposed portions N are formed close to the coupling members 35 on all the segment coils 30, 30i, and 30o of the coil assemblies A1 to A8.

When the stator core 2 and the coil assemblies A1 to A8 and A12 to A78 are set on the attachment apparatus 100, the controller 150 controls the raising apparatus 110 to raise the raising members P1, P23, P45, P67, and P8 by a predetermined distance, and controls the lowering apparatus 120 to lower the lowering members P12, P34, P56, and P78 by a predetermined distance. Thus, the coil assemblies A1 to A8 move to standby positions where the coupling members 35 attached to the tips T of the segment coils 30 and the like enter the corresponding slots 2s (insulators 4) of the stator core 2, and the coil assemblies A12 to A78 move to standby positions where the tips T of the segment coils 30 enter the corresponding slots 2s (insulators 4) of the stator core 2.

Subsequently, the controller 150 moves (raises) the movement member 131 of the tip position adjustment apparatus 130 into the central hole 2o of the stator core 2, and inserts the movable arms 132 into the corresponding slots 2s. The controller 150 moves the movement member 131 so that the lower engagement claws 133 of the movable arms 132 engage with the upper ends of the coupling members 35 attached to the tips T of the legs 31 of the segment coils 30 of the coil assembly A23 that are inserted into the same slots 2s. After the engagement claws 133 of the movable arms 132 engage with the corresponding coupling members 35, the controller 150 slightly moves the movable arms 132 toward the movement member 131.

Figure 13:
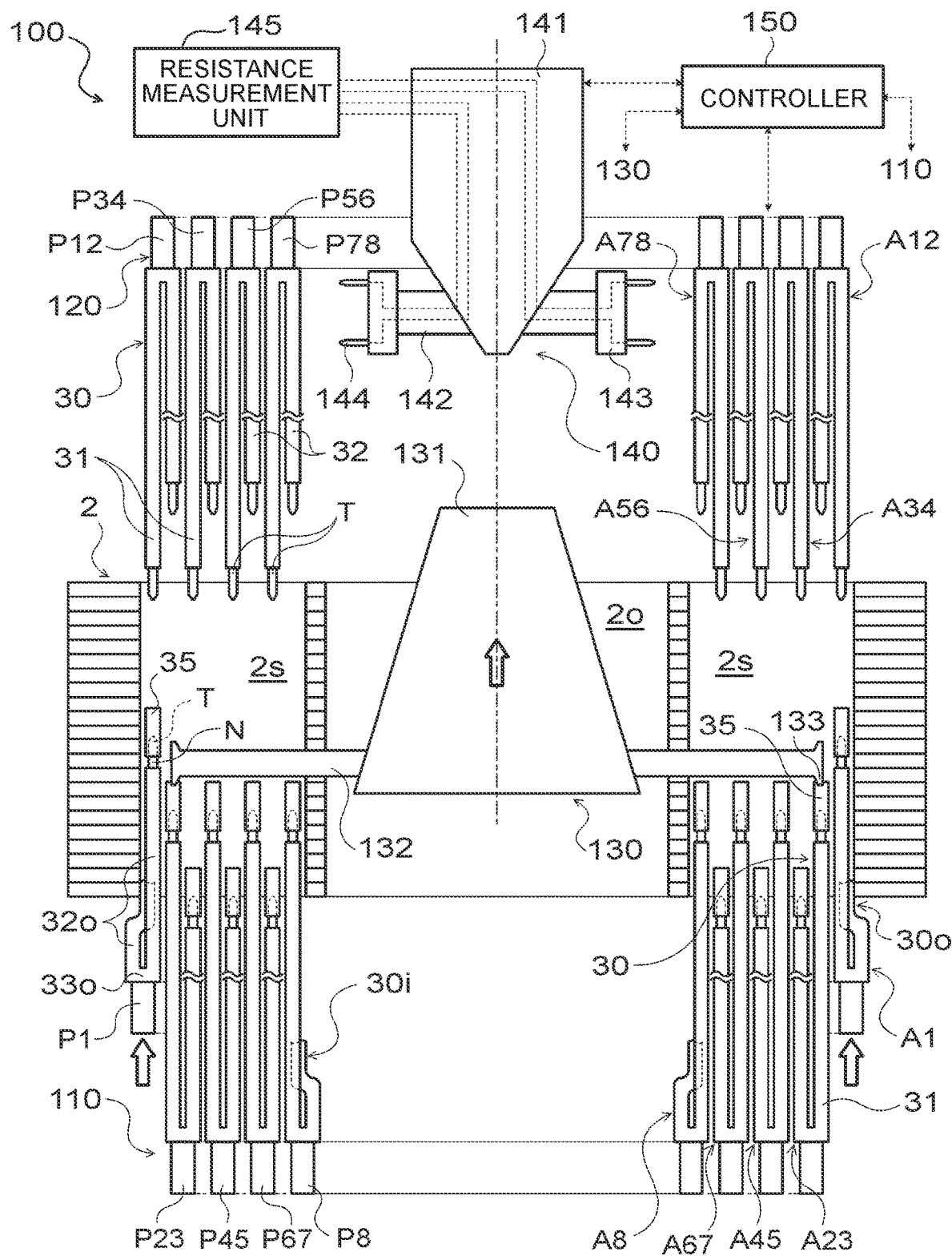
FIG. 13 is an explanatory drawing illustrating a procedure of manufacturing the stator according to the first embodiment.

As illustrated in FIG. 13, the controller 150 raises the raising member P1 of the raising apparatus 110 (alone) so that the legs 32o of the segment coils 30o of the coil assembly A1 in the inverse lead-side outermost layer are raised by a predetermined distance from the standby positions in the corresponding slots 2s. Thus, the coupling members 35 attached to the tips T of the segment coils 30o (legs 32o) of the coil assembly A1 reach predetermined positions in the slots 2s. When raising the raising member P1, the controller 150 raises the movement member 131 of the tip position adjustment apparatus 130 in synchronization with the raising of the coil assembly A1. Thus, it is possible to reduce the occurrence of a case where, when the coil assembly A1 is raised, the legs 32o of the segment coils 30o of the coil assembly A1 or the coupling members 35 attached to the legs 32o interfere with, for example, the coupling members 35 attached to the segment coils 30 of the coil assembly A23 adjacent on the inner layer side.

Figure 14:
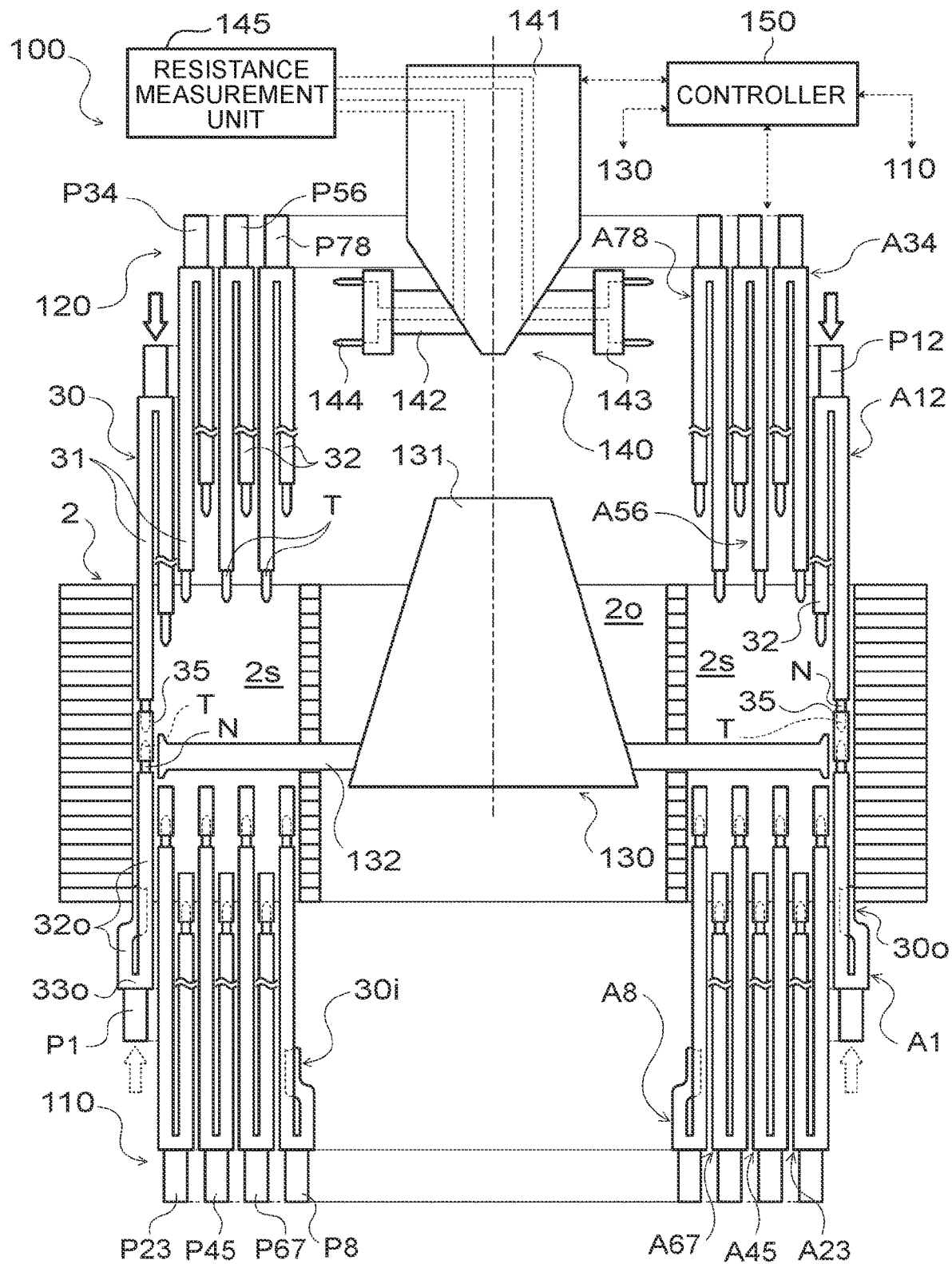
FIG. 14 is an explanatory drawing illustrating the procedure of manufacturing the stator according to the first embodiment.

When the coupling members 35 attached to the segment coils 30o of the coil assembly A1 reach the predetermined positions in the slots 2s, the controller 150 stops the raising member P1 and the movement member 131 of the tip position adjustment apparatus 130. The controller 150 moves the movement member 131 and the movable arms 132 so that the engagement claws 133 are spaced away from the corresponding coupling members 35 and the tip faces of the movable arms 132 can support the outer peripheral surfaces of the corresponding coupling members 35. After the movement member 131 and the movable arms 132 are moved, the controller 150 lowers the lowering member P12 of the lowering apparatus 120 (alone) as illustrated in FIG. 14 so that the legs 31 of the segment coils 30 of the coil assembly A12 in the lead-side outermost layer are lowered by a predetermined distance from the standby positions in the corresponding slots 2s. At this time, the segment coils 30o of the coil assembly A1 are supported by the raising member P1 from the bottom (see dotted arrows in FIG. 14).

In the slots 2s, the tips T of the legs 31 of the segment coils 30 of the coil assembly A12 are fitted into the ends of the coupling members 35 attached to the tips T of the legs 32o of the segment coils 30o of the coil assembly A1, thereby forming a first layer of the tips T adjacent to each other in the circumferential direction of the stator core 2. That is, the tips T of the plurality of legs 31 of the coil assembly A12 are electrically connected collectively to the tips T of the plurality of legs 32o of the coil assembly A1. At this time, the thick portions Tb of the tips T of the legs 31 are exposed from the coupling members 35 (see FIG. 9), and the conductor-exposed portions N are formed close to the coupling members 35 on the legs 31 of the segment coils 30 of the coil assembly A12. As a result, the conductor-exposed portions N having necessary and sufficient areas are arranged with appropriate distances therebetween on both sides of the connection portions between the tips T of the legs 31 and 32o, that is, the coupling members 35 in the first layer.

Figure 15:
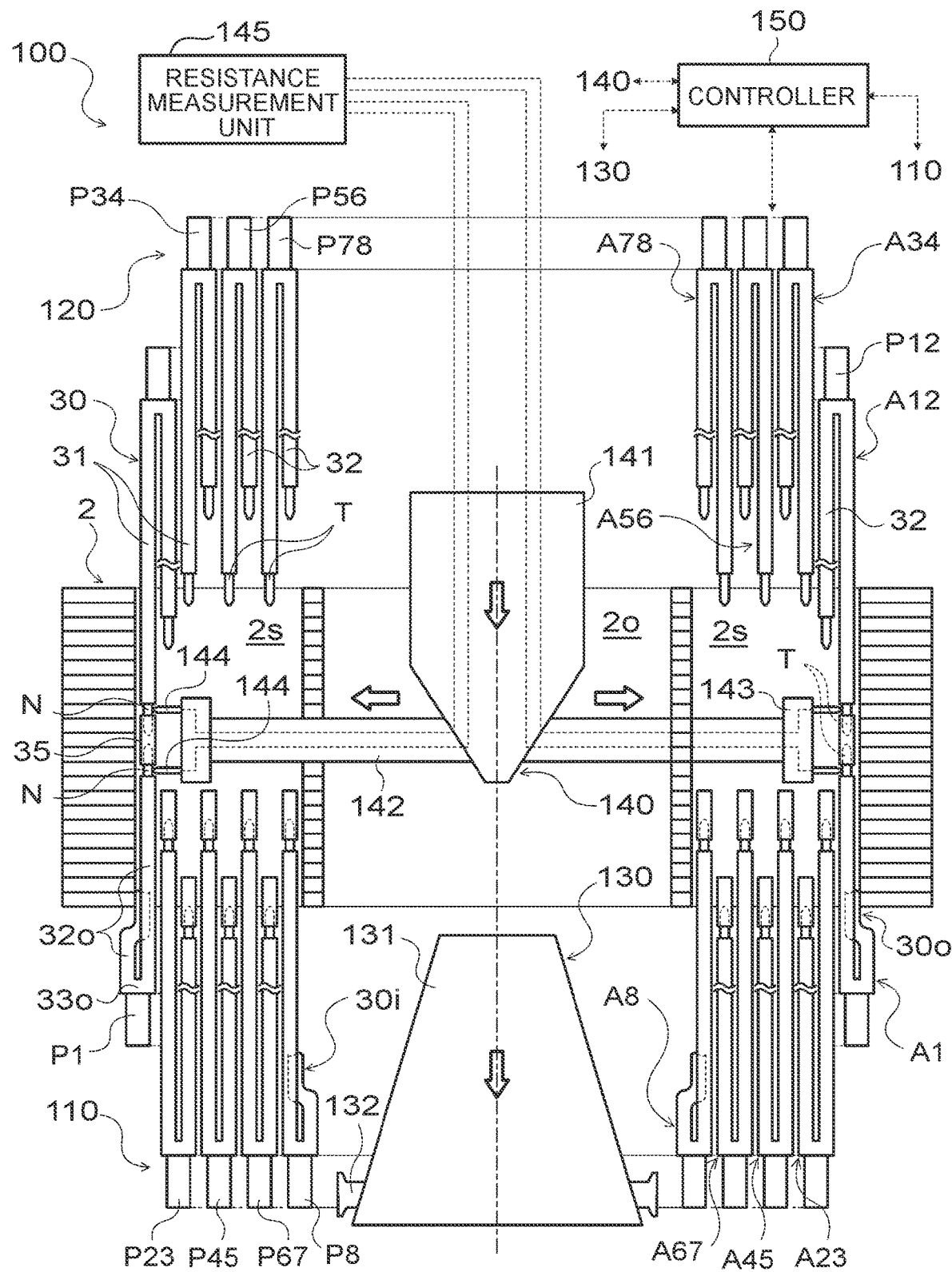
FIG. 15 is an explanatory drawing illustrating the procedure of manufacturing the stator according to the first embodiment.

After the connection between the plurality of legs 32o of the coil assembly A1 and the plurality of legs 31 of the coil assembly A12 is completed, the controller 150 retreats the movable arms 132 from the slots 2s, and retreats the movement member 131 of the tip position adjustment apparatus 130 to the initial position. Next, the controller 150 moves (lowers) the movement member 141 of the resistance measurement apparatus 140 into the central hole 2o of the stator core 2 so that the probe heads 143 of the two movable arms 142 face the coupling members 35 in predetermined slots 2s. As illustrated in FIG. 15, the controller 150 inserts the movable arms 142 and the probe heads 143 into the two target slots 2s, and brings the probes 144 held by the probe heads 143 into contact with the corresponding conductor-exposed portions N formed on the legs 31 and 32o in the first layer. At this time, the legs 32 connected to the legs 31 of the coil assembly A12 in the first layer via the connecting wires 33 are located on an inner layer side of the legs 31. The legs 32 are shorter than the legs 31. Thus, the pairs of probes 144 inserted into the slots 2s from the central hole 2o are not obstructed by the legs 32 arranged on the inner layer side. Accordingly, the probes 144 can securely be brought into contact with the conductor-exposed portions N near the connection portions between the legs 31 and 32o in the first layer arranged on an outer layer side.

When the probes 144 of each probe head 143 are brought into contact with the corresponding conductor-exposed portions N, the controller 150 controls the resistance measurement unit 145 so that a current flows between the two conductor-exposed portions N via the probes 144 of each probe head 143, and causes the resistance measurement unit 145 to measure the electric resistance of the connection portion between the tips T of the legs 31 and 32o in the first layer. At this time, the legs 31 and 32o and the coupling member 35 in the first layer are supported by an outer peripheral wall of the slot 2s. Thus, the electric resistance can be measured accurately. When the electric resistance of the connection portion is measured, the resistance measurement unit 145 transmits a signal indicating a measurement value to the controller 150. The controller 150 determines whether connection failure occurs in the connection portion between the target tips T based on the signal from the resistance measurement unit 145.

When determination is made that the connection failure occurs in the connection portion between the tips T based on the signal from the resistance measurement unit 145, the controller 150 suspends the attachment of the segment coils 30 and the like to the stator core 2 on this occasion, and alerts that the connection failure occurs. Thus, the connection portion where the connection failure occurs can be identified, and the connection failure in the connection portion can be reduced. When determination is made that no connection failure occurs in the connection portion between the tips T based on the signal from the resistance measurement unit 145, the controller 150 retreats the probe heads 143 (movable arms 142) from the slots 2s, and then rotates the movement member 141 about the axis of the stator core 2 by a predetermined angle (for example, 7.5° in this embodiment) so that the probe heads 143 of the two movable arms 142 face the coupling members 35 in adjacent slots 2s. Then, the controller 150 sequentially measures the electric resistances of the connection portions between the tips T in the first layer through the procedure described above. That is, in this embodiment, the tips T in the first layer are connected together, and then the electric resistances are measured for all the connection portions between the tips T in the first layer.

When the measurement of the electric resistances of the connection portions between the tips T included in the first layer is completed, the controller 150 retreats the movable arms 142 from the slots 2s, and retreats the movement member 141 of the resistance measurement apparatus 140 to the initial position. The controller 150 raises the movement member 131 of the tip position adjustment apparatus 130 into the central hole 2o of the stator core 2, and inserts the movable arms 132 into the corresponding slots 2s. The controller 150 moves the movement member 131 so that the lower engagement claws 133 of the movable arms 132 engage with the upper ends of the coupling members 35 attached to the tips T of the legs 31 of the segment coils 30 of the coil assembly A23 that are inserted into the same slots 2s. After the engagement claws 133 of the movable arms 132 engage with the corresponding coupling members 35, the controller 150 slightly moves the movable arms 132 toward the movement member 131.

Figure 16:
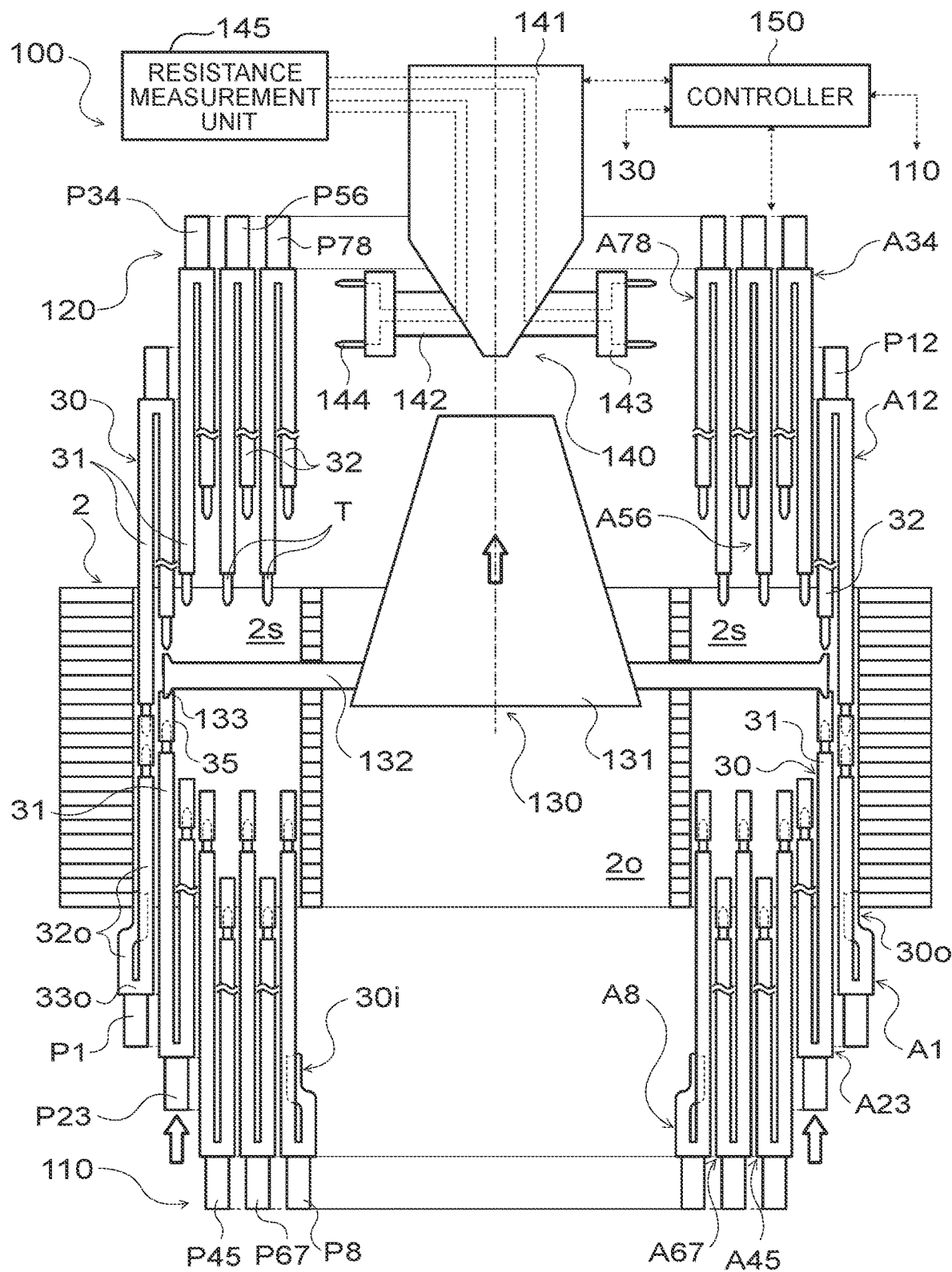
FIG. 16 is an explanatory drawing illustrating the procedure of manufacturing the stator according to the first embodiment.

Subsequently, the controller 150 raises the raising member P23 of the raising apparatus 110 (alone) as illustrated in FIG. 16 so that the legs 31 and 32 of the segment coils 30 of the coil assembly A23 on the inverse lead side are raised in the corresponding slots 2s, and raises the movement member 131 of the tip position adjustment apparatus 130 in synchronization with the raising of the coil assembly A23.

Thus, it is possible to reduce the occurrence of a case where, when the coil assembly A23 is raised, the coupling members 35 attached to the legs 31 of the segment coils 30 of the coil assembly A23 interfere with, for example, the coupling members 35 in the first layer arranged on the outer layer side.

Figure 17:
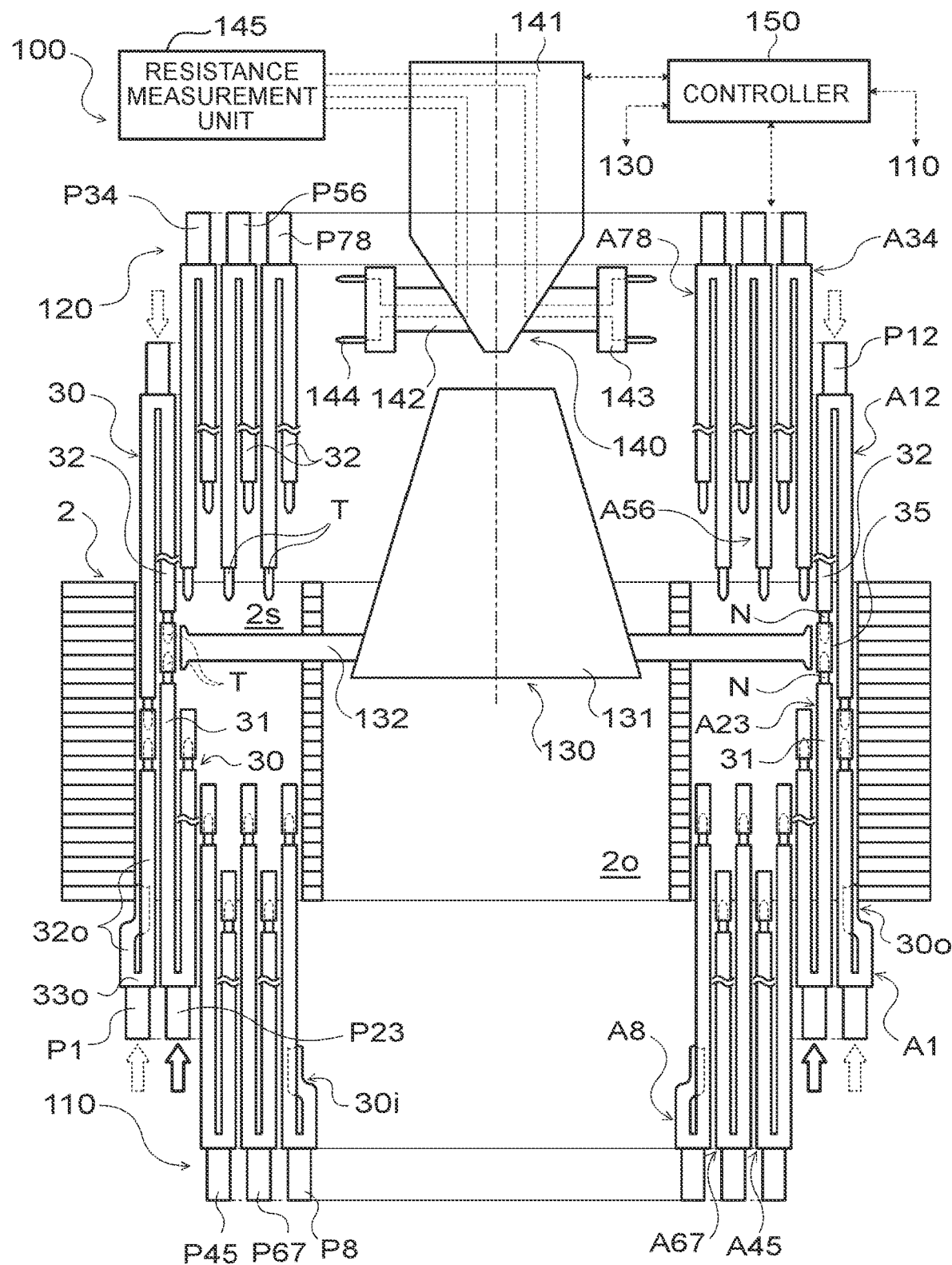
FIG. 17 is an explanatory drawing illustrating the procedure of manufacturing the stator according to the first embodiment.

When the coupling members 35 attached to the legs 31 of the segment coils 30 of the coil assembly A23 reach predetermined positions above the coupling members 35 in the first layer as illustrated in FIG. 16, the controller 150 temporarily stops the raising member P23 and the movement member 131. As illustrated in FIG. 17, the controller 150 moves the movement member 131 and the movable arms 132 so that the engagement claws 133 are spaced away from the corresponding coupling members 35 and the tip faces of the movable arms 132 can support the outer peripheral surfaces of the corresponding coupling members 35. The controller 150 raises the raising member P23 of the raising apparatus 110 (alone) so that the legs 31 and 32 of the segment coils 30 of the coil assembly A23 are raised by a predetermined distance in the corresponding slots 2s. At this time, the segment coils 30o of the coil assembly A1 on the inverse lead side are supported by the raising member P1 from the bottom, and the segment coils 30 of the coil assembly A12 on the lead side are supported by the lowering member P12 from the top (see dotted arrows in FIG. 17).

In the slots 2s, the tips T of the legs 32 of the segment coils 30 of the coil assembly A12 are fitted into the ends of the coupling members 35 attached to the tips T of the legs 31 of the segment coils 30 of the coil assembly A23, thereby forming a second layer of the tips T adjacent to each other in the circumferential direction of the stator core 2. That is, the tips T of the plurality of legs 32 of the coil assembly A12 are electrically connected collectively to the tips T of the plurality of legs 31 of the segment coils 30 of the coil assembly A23. At this time, the thick portions Tb of the tips T of the legs 32 are exposed from the coupling members 35 (see FIG. 9), and the conductor-exposed portions N are formed close to the coupling members 35 on the legs 32 of the segment coils 30 of the coil assembly A12. As a result, the conductor-exposed portions N having necessary and sufficient areas are arranged with appropriate distances therebetween on both sides of the connection portions between the tips T of the legs 31 and the legs 32, that is, the coupling members 35 in the second layer.

Figure 18:
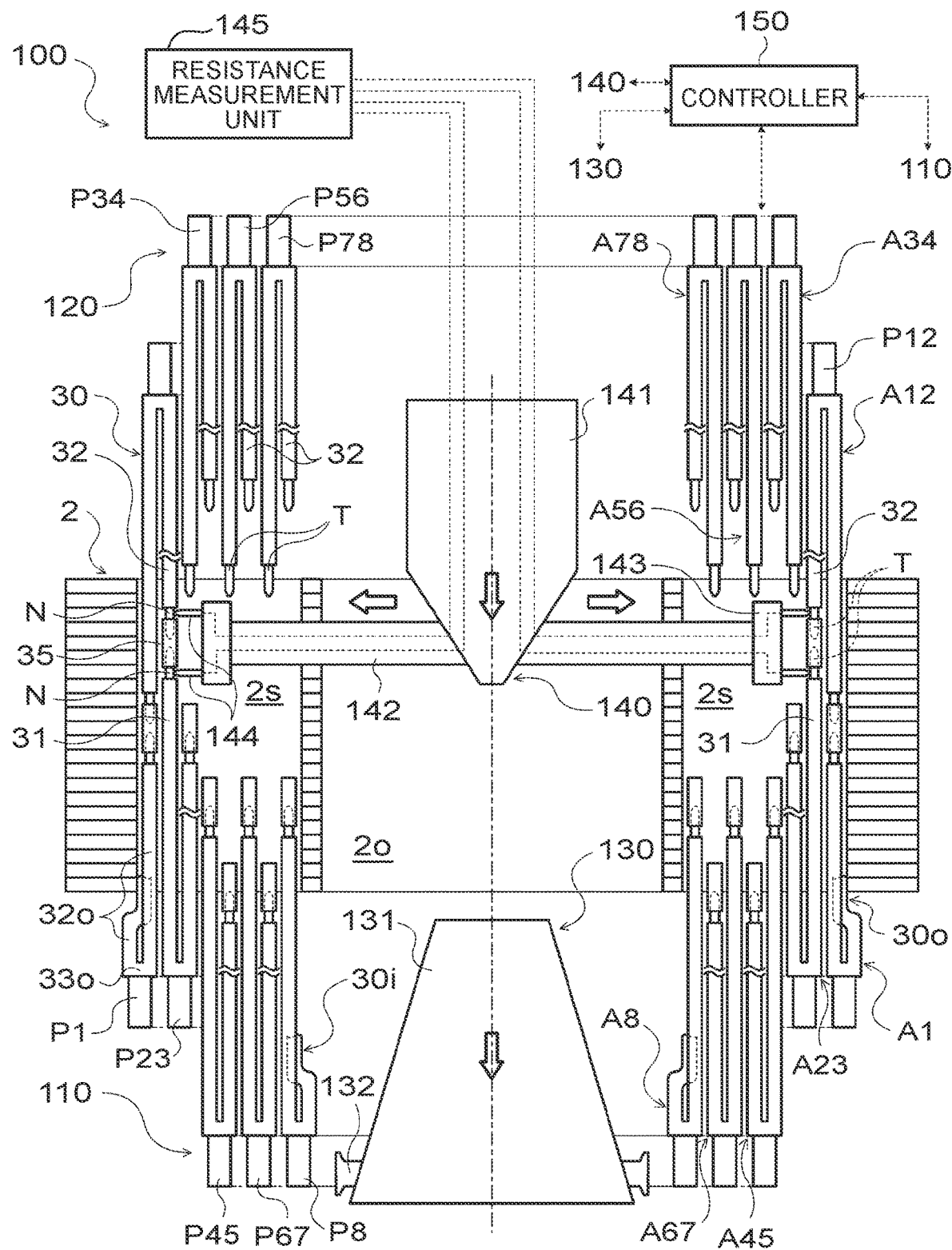
FIG. 18 is an explanatory drawing illustrating the procedure of manufacturing the stator according to the first embodiment.

After the connection between the plurality of legs 31 of the coil assembly A23 and the plurality of legs 32 of the coil assembly A12 is completed, the controller 150 retreats the movable arms 132 from the slots 2s, and retreats the movement member 131 of the tip position adjustment apparatus 130 to the initial position. The controller 150 inserts the movable arms 142 and the probe heads 143 into two predetermined slots 2s, and brings the probes 144 held by the probe heads 143 into contact with the corresponding conductor-exposed portions N formed on the legs 31 and 32 in the second layer as illustrated in FIG. 18. At this time, the legs 32 connected to the legs 31 of the coil assembly A23 in the second layer via the connecting wires 33 are located on an inner layer side of the legs 31. The legs 32 are shorter than the legs 31. Thus, the pairs of probes 144 inserted into the slots 2s from the central hole 2o are not obstructed by the legs 32 arranged on the inner layer side. Accordingly, the probes 144 can securely be brought into contact with the conductor-exposed portions N near the connection portions between the legs 31 and 32 in the second layer arranged on an outer layer side.

When the probes 144 are brought into contact with the corresponding conductor-exposed portions N, the controller 150 causes the resistance measurement unit 145 to measure the electric resistance of the connection portion between the tips T of the legs 31 and 32 in the second layer. At this time, the legs 31 and 32 and the coupling member 35 in the second layer are supported by the legs 31 and 32o and the coupling member 35 in the first layer and the outer peripheral wall of the slot 2s. Thus, the electric resistance can be measured accurately. When determination is made that connection failure occurs in the connection portion between the tips T based on a signal from the resistance measurement unit 145, the controller 150 suspends the attachment of the segment coils 30 and the like to the stator core 2 on this occasion, and alerts that the connection failure occurs. When determination is made that no connection failure occurs in the connection portion between the tips T based on the signal from the resistance measurement unit 145, the controller 150 sequentially measures the electric resistances of the connection portions between the tips T in the second layer while rotating the movement member 141 about the axis of the stator core 2 by the predetermined angle. That is, in this embodiment, the tips T in the second layer are connected together, and then the electric resistances are measured for all the connection portions between the tips T in the second layer.

When the measurement of the electric resistances of the connection portions between the tips T included in the second layer is completed, the controller 150 retreats the movement member 141 of the resistance measurement apparatus 140 to the initial position, raises the movement member 131 of the tip position adjustment apparatus 130 into the central hole 2o of the stator core 2, and inserts the movable arms 132 into the corresponding slots 2s. The controller 150 moves the movement member 131 so that the upper engagement claws 133 of the movable arms 132 engage with the tips T of the legs 31 of the segment coils 30 of the coil assembly A34 (long-side surfaces on an outer side in the radial direction) that are inserted into the same slots 2s. After the engagement claws 133 of the movable arms 132 engage with the corresponding tips T, the controller 150 slightly moves the movable arms 132 toward the movement member 131.

Figure 19:
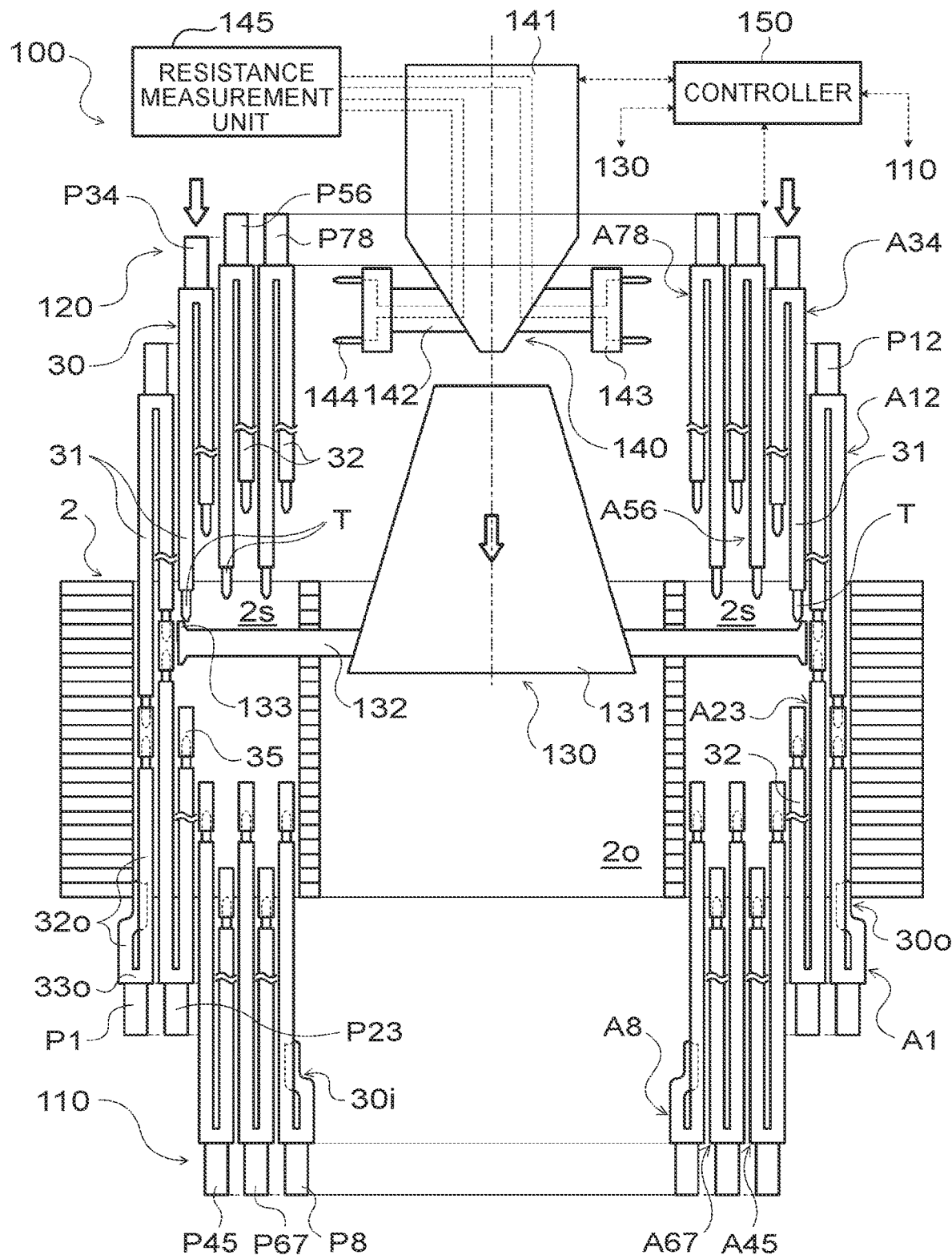
FIG. 19 is an explanatory drawing illustrating the procedure of manufacturing the stator according to the first embodiment.

Subsequently, the controller 150 lowers the lowering member P34 of the lowering apparatus 120 (alone) as illustrated in FIG. 19 so that the legs 31 and 32 of the segment coils 30 of the coil assembly A34 on the lead side are lowered in the corresponding slots 2s, and lowers the movement member 131 of the tip position adjustment apparatus 130 in synchronization with the lowering of the coil assembly A34. Thus, it is possible to reduce the occurrence of a case where, when the coil assembly A34 is lowered, the tips T of the legs 31 of the segment coils 30 of the coil assembly A34 interfere with, for example, the coupling members 35 in the second layer arranged on the outer layer side.

Figure 20:
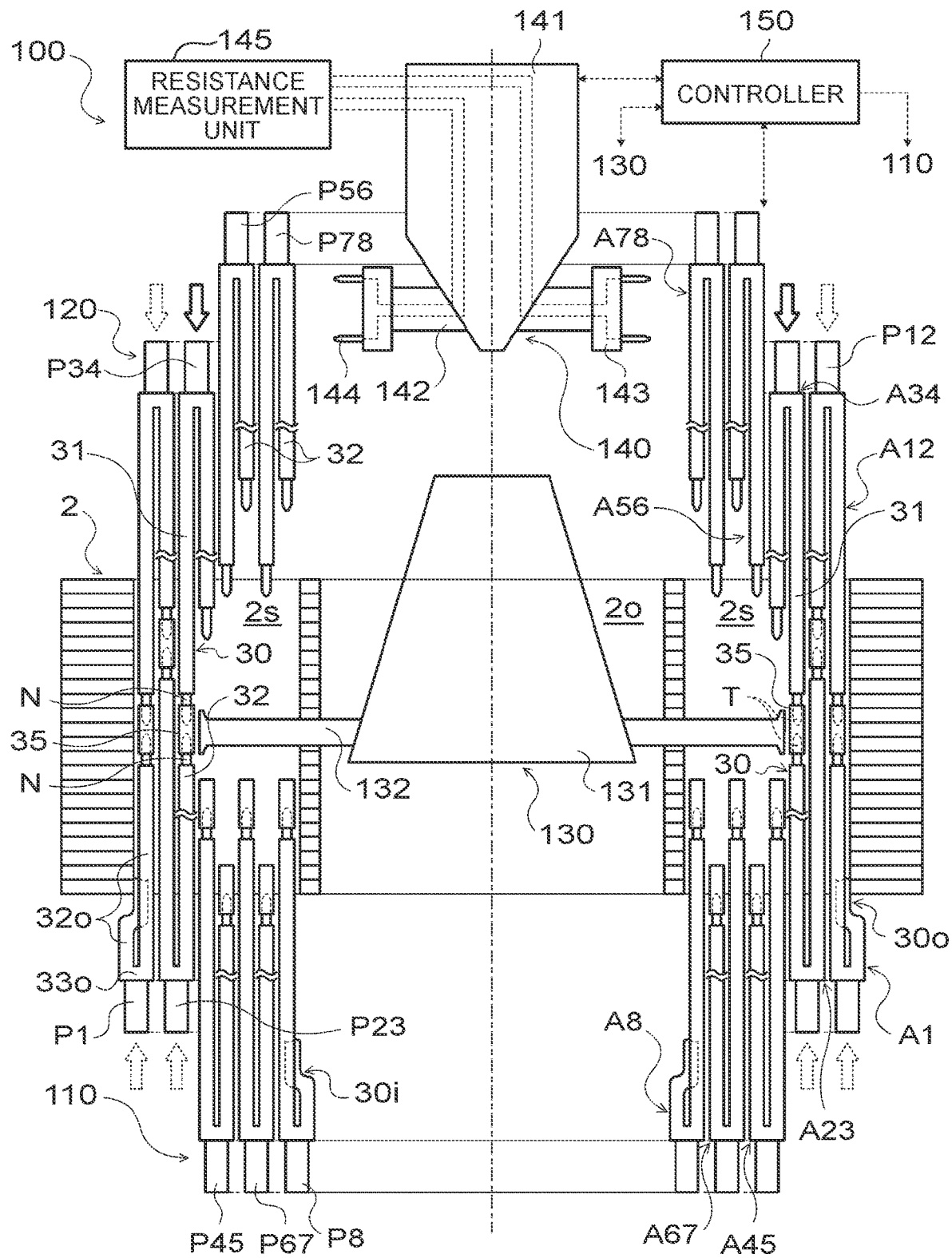
FIG. 20 is an explanatory drawing illustrating the procedure of manufacturing the stator according to the first embodiment.

When the tips T of the legs 31 of the segment coils 30 of the coil assembly A34 reach predetermined positions below the coupling members 35 in the second layer, the controller 150 temporarily stops the lowering member P34 and the movement member 131. As illustrated in FIG. 20, the controller 150 moves the movement member 131 and the movable arms 132 so that the engagement claws 133 are spaced away from the corresponding tips T and the tip faces of the movable arms 132 can support the outer peripheral surfaces of the corresponding coupling members 35. The controller 150 lowers the lowering member P34 of the lowering apparatus 120 (alone) so that the legs 31 and 32 of the segment coils 30 of the coil assembly A34 are lowered by a predetermined distance in the corresponding slots 2s. At this time, the segment coils 30 of the coil assembly A23 and the segment coils 30o of the coil assembly A1 on the inverse lead side are supported by the raising members P23 and P1 from the bottom, and the segment coils 30 of the coil assembly A12 on the lead side are supported by the lowering member P12 from the top (see dotted arrows in FIG. 20).

In the slots 2s, the tips T of the legs 31 of the segment coils 30 of the coil assembly A34 are fitted into the ends of the coupling members 35 attached to the tips T of the legs 32 of the segment coils 30 of the coil assembly A23, thereby forming a third layer of the tips T adjacent to each other in the circumferential direction of the stator core 2. That is, the tips T of the plurality of legs 31 of the coil assembly A34 are electrically connected collectively to the tips T of the plurality of legs 32 of the coil assembly A23. At this time, the thick portions Tb of the tips T of the legs 31 are exposed from the coupling members 35 (see FIG. 9), and the conductor-exposed portions N are formed close to the coupling members 35 on the legs 31 of the segment coils 30 of the coil assembly A34. As a result, the conductor-exposed portions N having necessary and sufficient areas are arranged with appropriate distances therebetween on both sides of the connection portions between the tips T of the legs 31 and the legs 32, that is, the coupling members 35 in the third layer.

Figure 21:
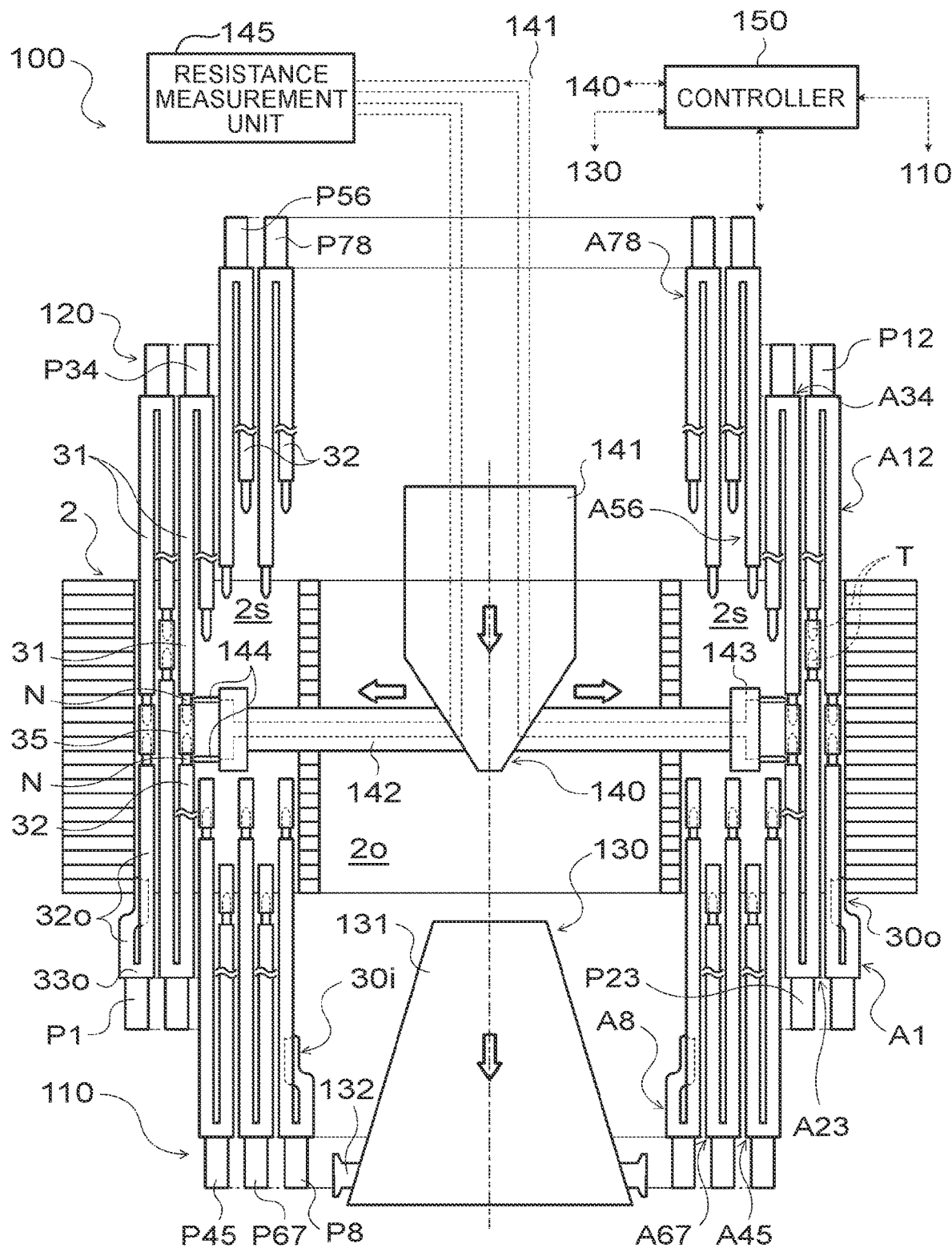
FIG. 21 is an explanatory drawing illustrating the procedure of manufacturing the stator according to the first embodiment.

After the connection between the plurality of legs 32 of the coil assembly A23 and the plurality of legs 31 of the coil assembly A34 is completed, the controller 150 retreats the movement member 131 of the tip position adjustment apparatus 130 to the initial position. The controller 150 inserts the movable arms 142 and the probe heads 143 into two predetermined slots 2s, and brings the probes 144 held by the probe heads 143 into contact with the corresponding conductor-exposed portions N formed on the legs 31 and 32 in the third layer as illustrated in FIG. 21. At this time, the legs 32 connected to the legs 31 of the coil assembly A34 in the third layer via the connecting wires 33 are located on an inner layer side of the legs 31. The legs 32 are shorter than the legs 31. Thus, the pairs of probes 144 inserted into the slots 2s from the central hole 2o are not obstructed by the legs 32 arranged on the inner layer side. Accordingly, the probes 144 can securely be brought into contact with the conductor-exposed portions N near the connection portions between the legs 31 and 32 in the third layer arranged on an outer layer side.

When the probes 144 are brought into contact with the corresponding conductor-exposed portions N, the controller 150 causes the resistance measurement unit 145 to measure the electric resistance of the connection portion between the tips T of the legs 31 and 32 in the third layer. At this time, the legs 31 and 32 and the coupling member 35 in the third layer are supported by the legs 31, 32, and 32o and the coupling members 35 in the first and second layers and the outer peripheral wall of the slot 2s. Thus, the electric resistance can be measured accurately. When determination is made that connection failure occurs in the connection portion between the tips T based on a signal from the resistance measurement unit 145, the controller 150 suspends the attachment of the segment coils 30 and the like to the stator core 2 on this occasion, and alerts that the connection failure occurs. When determination is made that no connection failure occurs in the connection portion between the tips T based on the signal from the resistance measurement unit 145, the controller 150 sequentially measures the electric resistances of the connection portions between the tips T in the third layer while rotating the movement member 141 about the axis of the stator core 2 by the predetermined angle. That is, in this embodiment, the tips T in the third layer are connected together, and then the electric resistances are measured for all the connection portions between the tips T in the third layer.

When the measurement of the electric resistances of the connection portions between the tips T included in the third layer is completed, the controller 150 connects the tips T included in the same layer and measures the electric resistances of the connection portions included in the same layer for each of the remaining fourth to eighth layers in accordance with the procedure described with reference to FIG. 13 to FIG. 21. Thus, the winding of the stator coils 3u, 3v, and 3w around the stator core 2 is completed.

The stator core 2 where the stator coils 3u, 3v, and 3w are wound is taken out from the support portion. The stator core 2 is subjected to heat treatment. In this embodiment, a current is applied to the stator coils 3u, 3v, and 3w from a direct current (DC) power supply for the heat treatment. By applying the current from the DC power supply, the stator coils 3u, 3v, and 3w generate heat, and the foamed adhesive layers 4b of the insulators 4 are heated to expand by the heat from the stator coils 3u, 3v, and 3w. When the expanded foamed adhesive layers 4b of the insulators 4 are cured, adjacent segment coils 30, 30i, and 30o, adjacent segment coils 30 or the like and the insulators 4, and the insulators 4 and the stator core 2 are firmly fixed without gaps. The conductor-exposed portions N of the segment coils 30, 30i, and 30o are covered with the expanded and cured foamed adhesive layers 4b of the insulators 4.

As described above, when the stator 1 is manufactured, the tips T of the plurality of segment coils 30 or the like are electrically connected to the tips T of other corresponding segment coils 30 or the like, and the electric resistances of the connection portions between the tips T are measured for each layer of the tips T of the segment coils 30, 30i, and 30o. In the stator 1 finally obtained by intricately attaching the pluralities of segment coils 30, 30i, and 30o to the stator core 2, the electric resistances can be measured by accessing all the connection portions between the tips T. As a result, in the stator 1 in which the corresponding tips T are electrically connected via the coupling members 35, the reliability of the stator 1 can further be improved by identifying the connection portion between the tips T where the connection failure occurs and eliminating the connection failure in the identified connection portion.

When the stator 1 is manufactured, the tips T of the legs 31 or 32 of the plurality of segment coils 30 or the like that are included in the same layer are electrically connected collectively to the tips T of other corresponding legs 31 or 32. Thus, the step of connecting the segment coils 30 or the like can be shortened.

When the stator 1 is manufactured, the tips T are connected together and the electric resistances of the connection portions between the tips T are measured for each of the layers in the order from the first layer on the outer layer side to the eighth layer on the inner layer side in the radial direction. Thus, when the electric resistances of the connection portions between the tips T are measured, the legs 31, 31i, 32, and 32o and the coupling members 35, which include the target connection portions for the measurement of the electric resistances, can be supported by the outer peripheral walls of the slots 2s and the legs 31, 31i, 32, and 32o of the segment coils 30 and the like arranged on the outer layer side. As a result, the electric resistances can be measured accurately.

When the tips T of the legs 31, 31*i*, 32, and 32*o* of the two corresponding segment coils 30 and the like are connected together in the manufacture of the stator 1, the conductor-exposed portions N to be brought into contact with the probes 144 of the resistance measurement apparatus 140 are formed close to the connection portion between the tips T of the two segment coils 30 and the like. Thus, the electric resistance of the connection portion can be measured accurately such that the pair of probes 144 of the resistance measurement apparatus 140 are brought into contact with the two conductor-exposed portions N close to the connection portion between the tips T of the two corresponding segment coils 30 and the like.

When the tips T of the two segment coils 30 or the like are electrically connected by being fitted into both ends of the tubular coupling member 35, the conductor-exposed portions N are formed by exposing the thick portions Tb, which are parts of the tips T without the insulating films IL, from the coupling member 35. Thus, the conductor-exposed portions N having necessary and sufficient areas can be arranged with an appropriate distance therebetween on both sides of the connection portion between the tips T of the segment coils 30 or the like without removing the insulating films IL at portions other than the tips T of the segment coils 30 or the like.

The legs 31, 31*i*, 32, and 32*o* of the segment coils 30, 30*i*, and 30*o* (first segment coils) of the coil assemblies A1, A23, A45, A67, and A8 are inserted into different slots 2*s* from the inverse lead-side end face of the stator core 2. The legs 31 and 32 of the segment coils 30 (second segment coils) of the coil assemblies A12, A34, A56, and A78 are inserted into different slots 2*s* from the lead-side end face of the stator core 2. The tips T of the segment coils 30 and the like are electrically connected by the coupling members 35 in the slots 2*s*. Thus, manufacturing costs of the stator 1 can be reduced by suppressing an increase in the number of segment coils 30, 30*i*, and 30*o* or the number of connection portions between the tips T and saving labor for the step of connecting the segment coils 30 and the like. In addition, the height of the entire stator 1 can be reduced by reducing the heights of the portions of the segment coils 30, 30*i*, and 30*o* that are located on the outer side of the end faces of the stator core 2, that is, the coil ends 3L and 3R.

The legs 31 and 32 of each segment coil 30 have different lengths, and the short leg 32 of the segment coil 30 is arranged on an immediately inner side of a layer including the long leg 31 connected via the connecting wire 33. In addition, the axial length al of the coupling member 35 is set equal to or smaller than the distance d between the end of the conductor-exposed portion N of the leg 31 that is closer to the insulating film IL (boundary with the insulating film IL) and the end of the conductor-exposed portion N of the leg 32 that is opposite to the insulating film IL. Thus, it is possible to suppress the occurrence of a case where the probes 144 inserted into the slot 2*s* from the central hole 2*o* cannot be brought into contact with the conductor-exposed portions N near the connection portion (coupling member 35) between the legs 31 arranged on an outer layer side by being obstructed by the legs 32 arranged on an inner layer side.

The coupling members 35 are attached (fitted) to all the tips T of the segment coils 30, 30*i*, and 30*o* (first segment coils) of the coil assemblies A1, A23, A45, A67, and A8 before the legs 31, 31*i*, 32, and 32*o* are inserted into the slots 2*s*. Thus, the step of connecting the segment coils 30 or the like can be simplified and shortened. The coupling members 35 may be attached (fitted) to all the tips T of the segment coils 30 (second segment coils) of the coil assemblies A12, A34, A56, and A78 before the legs 31 and 32 are inserted into the slots 2*s*.

The procedure of manufacturing the stator 1 that is described with reference to FIG. 12 to FIG. 21 is also applicable to manufacture of an annular coil that is not wound around the stator core. That is, the coil disclosed herein may be manufactured in accordance with the procedure illustrated in FIG. 12 to FIG. 21 without the stator core 2 by using the tip position adjustment apparatus 130 and various jigs.

Second Embodiment

Figure 22:
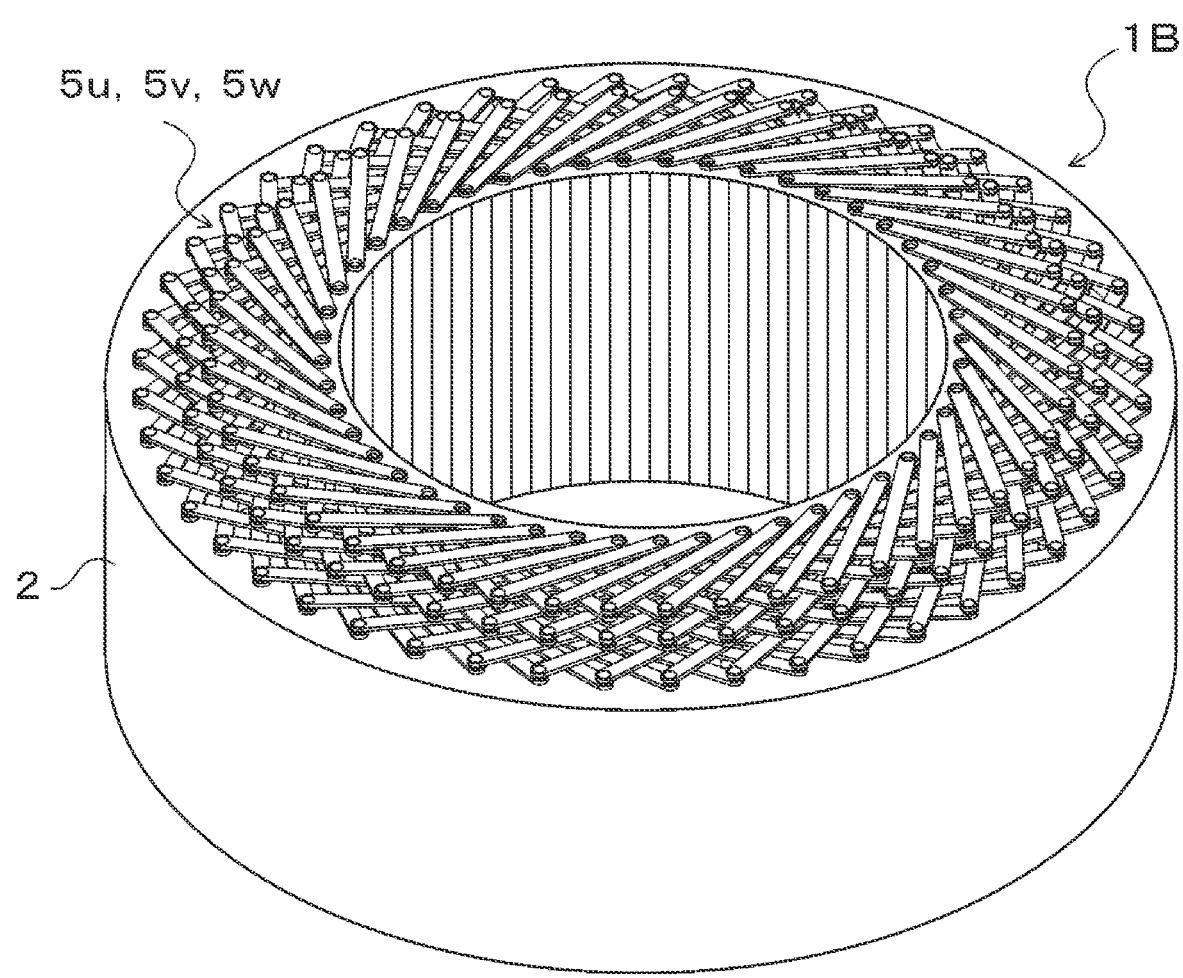
FIG. 22 is a perspective view illustrating a stator according to a second embodiment disclosed herein.
Figure 23:
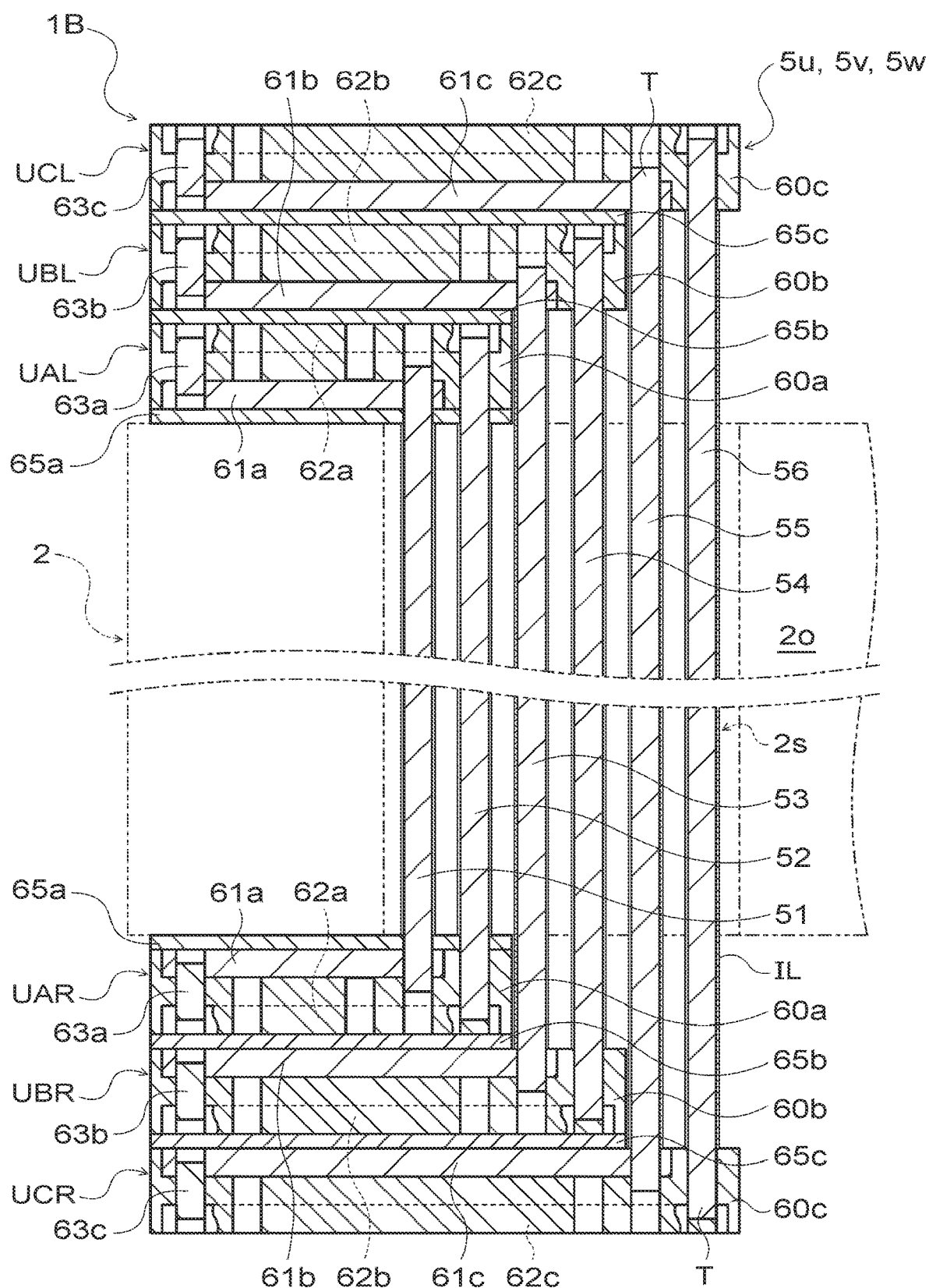
FIG. 23 is an overall structural view schematically illustrating the structure of the stator according to the second embodiment.

FIG. 22 is a perspective view illustrating a stator 1B according to a second embodiment disclosed herein. FIG. 23 is a sectional view illustrating the stator 1B. Components of the stator 1B that are identical to those of the stator 1 are represented by the same reference symbols to omit redundant description.

The stator 1B illustrated in FIG. 22 and FIG. 23 includes the annular stator core 2, a stator coil 5*u* (U-phase coil), a stator coil 5*v* (V-phase coil), and a stator coil 5*w* (W-phase coil). The stator core 2 includes the plurality of slots 2*s* (see FIG. 23) extending in the radial direction of the stator core 2, arrayed at predetermined intervals in the circumferential direction, and open to the central hole 2*o*.

In the stator 1B of the second embodiment, as illustrated in FIG. 23, each of the stator coils 5*u*, 5*v*, and 5*w* is formed by a plurality of slot coils (segment coils) 51, 52, 53, 54, 55, and 56, annular coupling coil units UAL, UBL, and UCL stacked on the lead side of the stator core 2, and annular coupling coil units UAR, UBR, and UCR stacked on the inverse lead side of the stator core 2. For example, each of the slot coils 51 to 56 is a bar-shaped conductor having the insulating film IL formed on its surface. The slot coils 51 to 56 have different axial lengths. At the tips T on both sides of each of the slot coils 51 to 56, the conductors are exposed by removing the insulating films IL. The slot coils 51 to 56 are arranged in the slots 2*s* of the stator core 2 so as to adjoin each other in the radial direction in ascending order of the axial length from the outer peripheral side toward the central hole 2*o*. That is, as illustrated in FIG. 23, the shortest slot coil 51 is located on the outermost side and the longest slot coil 56 is located on the innermost side in the slots 2*s*.

The coupling coil unit UAL is arranged close to the end face of the stator core 2 on the lead side (upper side in FIG. 23). The coupling coil unit UAR is arranged close to the end face of the stator core 2 on the inverse lead side (lower side in FIG. 23). Annular insulating members 65*a* are arranged between the lead-side end face of the stator core 2 and the coupling coil unit UAL and between the inverse lead-side end face of the stator core 2 and the coupling coil unit UAR. The coupling coil unit UBL is arranged on an outer side of the coupling coil unit UAL in the axial direction of the stator core 2. The coupling coil unit UBR is arranged on an outer side of the coupling coil unit UAR in the axial direction. Annular insulating members 65*b* are arranged between the coupling coil unit UAL and the coupling coil unit UBL and between the coupling coil unit UAR and the coupling coil unit UBR. The coupling coil unit UCL is arranged on an outer side of the coupling coil unit UBL in the axial direction. The coupling coil unit UCR is arranged on an outer side of the coupling coil unit UBR in the axial direction. Annular insulating members 65*c* are arranged between the coupling coil unit UBL and the coupling coil unit UCL and between the coupling coil unit UBR and the coupling coil unit UCR.

Figure 24:
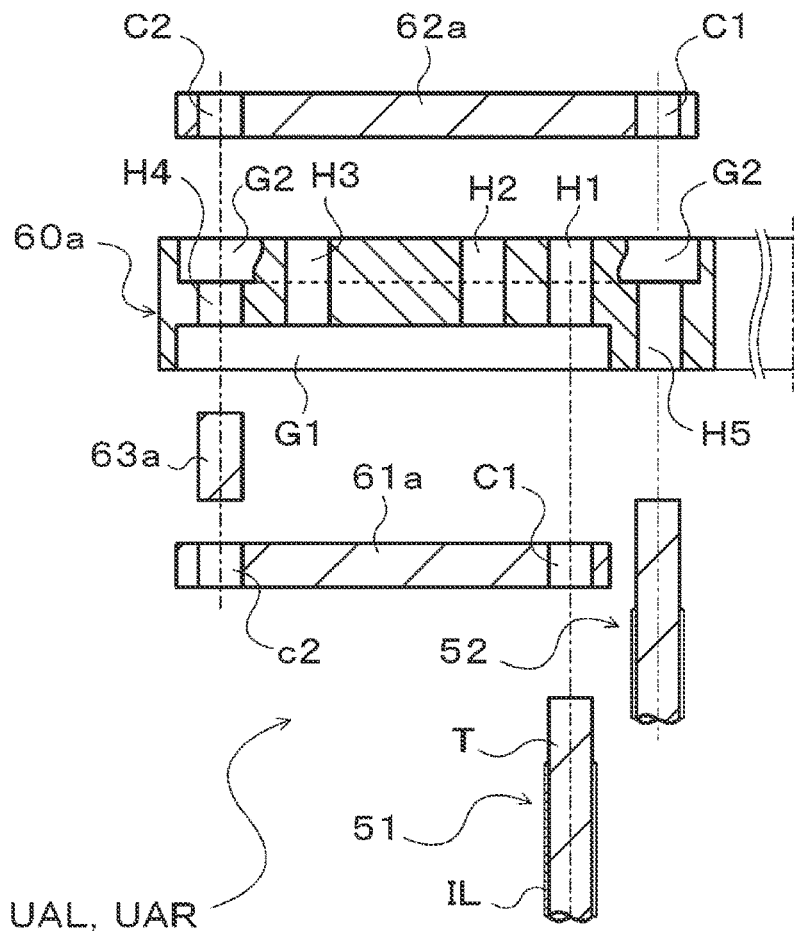
FIG. 24 is an exploded view illustrating a main part of the stator according to the second embodiment.

As illustrated in FIG. 23 and FIG. 24, the coupling coil unit UAL includes an annular base member 60a formed of an insulating material, a plurality of first coupling coils (segment coils) 61a, a plurality of second coupling coils (segment coils) 62a, and a plurality of short bar-shaped third coupling coils (segment coils) 63a. Each of the first, second, and third coupling coils 61a to 63a is a conductor whose surface is not covered with an insulating film. The coupling coil unit UAR basically has a structure in common with that of the coupling coil unit UAL. That is, as illustrated in FIG. 23, the coupling coil unit UAR also includes an annular base member 60a formed of an insulating material, a plurality of first coupling coils (segment coils) 61a, a plurality of second coupling coils (segment coils) 62a, and a plurality of third coupling coils (segment coils) 63a.

As illustrated in FIG. 24, the base member 60a includes a plurality of recesses G1 formed on one surface (lower side in FIG. 24), and a plurality of recesses G2 formed on the other surface (upper side in FIG. 24). The recesses G1 are arranged in the base member 60a so as to be inclined in the same direction with respect to the radial direction. The recesses G2 are arranged in the base member 60a so as to be inclined in the same direction with respect to the radial direction and extend in a direction opposite to that of the recesses G1 when viewed in the axial direction. The inner peripheral end of each recess G2 is closer to the inner periphery of the base member 60a than the inner peripheral end of each recess G1.

The base member 60a includes a plurality of first through holes H1, a plurality of second through holes H2, a plurality of third through holes H3, a plurality of fourth through holes H4, and a plurality of fifth through holes H5. Each first through hole H1 extends in the axial direction, and communicates with the inner peripheral end (one end) of the corresponding recess G1. Each second through hole H2 extends in the axial direction, and communicates with the corresponding recess G1. Each third through hole H3 extends in the axial direction, and communicates with the corresponding recess G1. Each fourth through hole H4 extends in the axial direction, and communicates with the outer peripheral end (other end) of each of the corresponding recesses G1 and G2. Each fifth through hole H5 extends in the axial direction, and communicates with the inner peripheral end (one end) of the corresponding recess G2. The first through hole H1 is formed so that the tip T of the slot coil 51 is fitted to the first through hole H1. The fourth through hole H4 is formed so that the third coupling coil 63a is fitted to the fourth through hole H4. The fifth through hole H5 is formed so that the tip T of the slot coil 52 is insertable through the fifth through hole H5. The second through hole H2 is formed close to the first through hole H1. The third through hole H3 is formed close to the fourth through hole H4. The first and fifth through holes H1 and H5 adjoin each other in a radial direction of the base member 60a. The fourth through holes H4 adjoin each other in a circumferential direction of the base member 60a. At least one of the second through holes H2 and at least one of the third through holes H3 may be open to the corresponding recess G2.

Each first coupling coil 61a has a first connection hole C1 formed at one end, and a second connection hole C2 formed at the other end. The first connection hole C1 of the first coupling coil 61a is formed so that the tip T of the slot coil 51 is fitted to the first connection hole C1. The second connection hole C2 of the first coupling coil 61a is formed so that the third coupling coil 63a is fitted to the second connection hole C2. The first coupling coils 61a are fitted (arranged) into the corresponding recesses G1 of the base member 60a so as to be located closer to the stator core 2. When each first coupling coil 61a is fitted into the corresponding recess G1, the first connection hole C1 of the first coupling coil 61a communicates with the first through hole H1, and the second connection hole C2 of the first coupling coil 61a communicates with the fourth through hole H4. When each first coupling coil 61a is fitted into the corresponding recess G1, the second and third through holes H2 and H3 reach the surface of the first coupling coil 61a that is closer to the recess G2.

Each second coupling coil 62a has a first connection hole C1 formed at one end, and a second connection hole C2 formed at the other end. The first connection hole C1 of the second coupling coil 62a is formed so that the tip T of the slot coil 52 is fitted to the first connection hole C1. The second connection hole C2 of the second coupling coil 62a is formed so that the third coupling coil 63a is fitted to the second connection hole C2. The second coupling coils 62a are fitted (arranged) into the corresponding recesses G2 of the base member 60a so as to be located on an outer side of the first coupling coils 61a in the axial direction of the stator core 2. When each second coupling coil 62a is fitted into the corresponding recess G2, the first connection hole C1 of the second coupling coil 62a communicates with the fifth through hole H5, and the second connection hole C2 of the second coupling coil 62a communicates with the fourth through hole H4.

The coupling coil units UBL, UBR, UCL, and UCR basically have structures in common with that of the coupling coil unit UAL except for dimensions of components or the like. That is, each of the coupling coil units UBL and UBR includes an annular base member 60b, a plurality of first coupling coils (segment coils) 61b, a plurality of second coupling coils (segment coils) 62b, and a plurality of third coupling coils (segment coils) 63b. The base member 60b is formed of an insulating material, and has recesses G1 and G2 and pluralities of first to fifth through holes H1 to H5. Each first coupling coil 61b has first and second connection holes C1 and C2. Each second coupling coil 62b has first and second connection holes C1 and C2. Each of the coupling coil units UCL and UCR includes an annular base member 60c, a plurality of first coupling coils (segment coils) 61c, a plurality of second coupling coils (segment coils) 62c, and a plurality of third coupling coils (segment coils) 63c. The base member 60c is formed of an insulating material, and has recesses G1 and G2 and pluralities of first to fifth through holes H1 to H5. Each first coupling coil 61c has first and second connection holes C1 and C2. Each second coupling coil 62c has first and second connection holes C1 and C2.

Referring to FIG. 25 to FIG. 30, description is given of a procedure of manufacturing the stator 1B, more specifically, a procedure of attaching the slot coils 51 to 56 and the coupling coil units UAL to UCR to the stator core 2 and winding the stator coils 5u, 5v, and 5w around the stator core 2.

When the slot coils 51 to 56 and the coupling coil units UAL to UCR are attached to the stator core 2, assemblies corresponding to the coupling coil units UAL to UCR where the second coupling coils 62a to 62c are not attached are prepared in advance. In the respective assemblies, the first coupling coils 61a to 61c are fitted to the recesses G1 of the base members 60a to 60c, and the third coupling coils 63a to 63c are fitted to the second connection holes C2 of the first coupling coils 61a to 61c and the fourth through holes H4 of the base members 60a to 60c so that the ends on one side protrude into the recesses G2.

Figure 25:
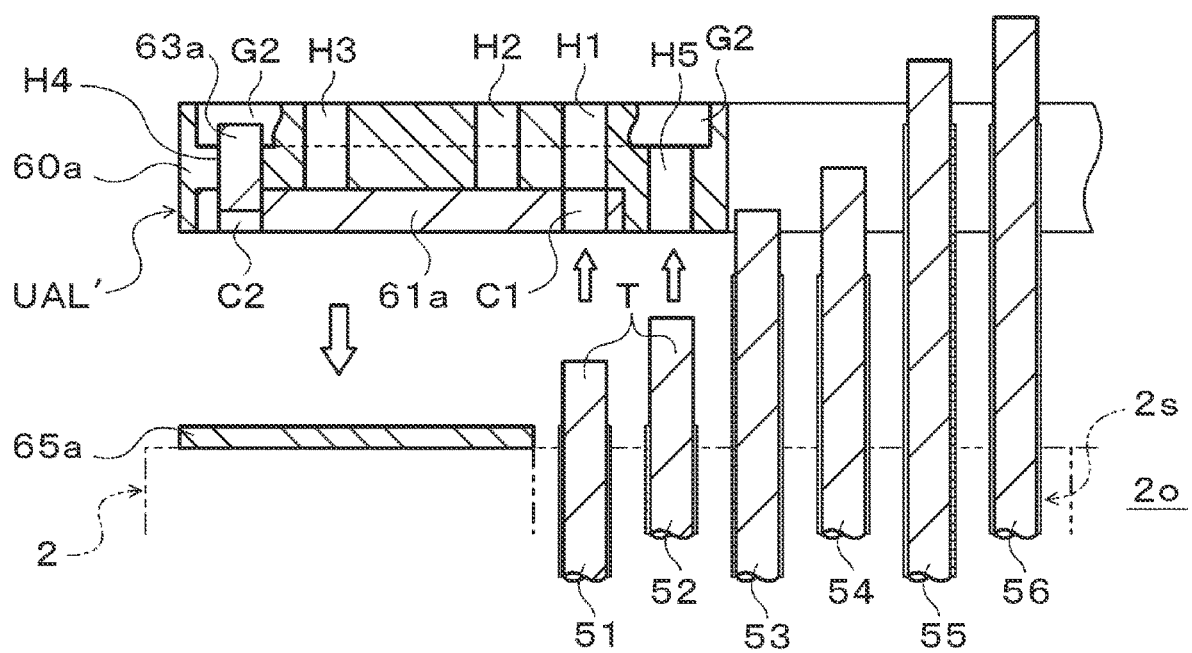
FIG. 25 is an explanatory drawing illustrating a procedure of manufacturing the stator according to the second embodiment.

As illustrated in FIG. 25, the slot coils 51 to 56 are arranged in the slots 2s of the stator core 2 so as to adjoin each other in the radial direction in ascending order of the axial length from the outer peripheral side toward the central hole 2o. At this time, the tips T on both sides of the slot coils 51 to 56 protrude outward from the lead-side and inverse lead-side end faces of the stator core 2. The amounts of protrusion from the end faces of the stator core 2 increase in order from the slot coil 51 to the slot coil 56. Thus, the stator core 2 has a plurality of (for example, six in the second embodiment) layers formed in the radial direction, including the tips T of the slot coils 51 to 56 adjacent to each other in the circumferential direction. A layer including outermost tips T is hereinafter referred to as "first layer". Layers on an inner side in the radial direction are hereinafter referred to as "second layer", "third layer" . . . in this order. A layer including innermost tips T is hereinafter referred to as "sixth layer".

Subsequently, as illustrated in FIG. 25, the insulating member 65a is arranged on, for example, the end face of the stator core 2 on the lead side (upper side in FIG. 25), and an assembly UAL' including the base member 60a, the first coupling coils 61a, and the third coupling coils 63a is arranged on the insulating member 65a so that the recesses G2 are located opposite to the stator core 2. When the assembly UAL' is arranged on the insulating member 65a, the tips T of the slot coils 51 arranged in the slots 2s in the first layer are fitted to the first connection holes C1 of the first coupling coils 61a of the assembly UAL'. The tips T of the slot coils 52 arranged in the slots 2s in the second layer are inserted through the fifth through holes H5 of the assembly UAL' (base member 60a) so as to protrude into the corresponding recesses G2. By arranging the assembly UAL' on the insulating member 65a, the tips T of the slot coils 51 (segment coils) in the first layer (outermost layer) are electrically connected collectively to the ends (first connection holes C1) of the corresponding first coupling coils 61a (segment coils).

After the assembly UAL' is arranged on the insulating member 65a, a resistance measurement apparatus 140B measures the electric resistances of each connection portion between the slot coil 51 and the first coupling coil 61a and each connection portion between the first coupling coil 61a and the third coupling coil 63a. The connection portion between the slot coil 51 and the first coupling coil 61a is a contact portion between the outer peripheral surface of the tip T of the slot coil 51 and the inner peripheral surface of the first connection hole C1 of the first coupling coil 61a. The connection portion between the first coupling coil 61a and the third coupling coil 63a is a contact portion between the inner peripheral surface of the second connection hole C2 of the first coupling coil 61a and the outer peripheral surface of the other end of the third coupling coil 63a.

Figure 26:
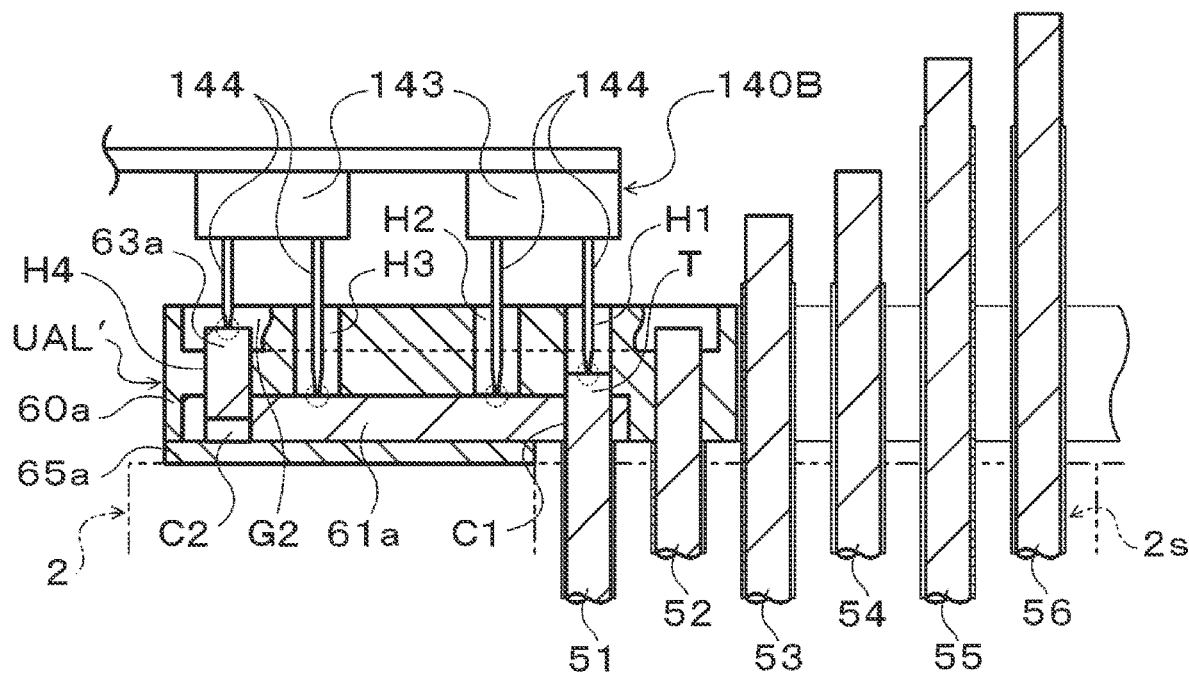
FIG. 26 is an explanatory drawing illustrating the procedure of manufacturing the stator according to the second embodiment.

When the assembly UAL' is arranged on the insulating member 65a and the tips T of the slot coils 51 and the other ends of the third coupling coils 63a are fitted to the first coupling coils 61a, as illustrated in FIG. 26, one of the probes 144 can be brought into contact with the end face of the tip T of the slot coil 51 through the first through hole H1, and the other one of the probes 144 can be brought into contact with a part of the surface of the first coupling coil 61a, to which the slot coil 51 is fitted, through the second through hole H2. Further, one of the probes 144 can be brought into contact with a part of the surface of the first coupling coil 61a through the third through hole H3, and the other one of the probes 144 can be brought into contact with the end face of the third coupling coil 63a fitted to the first coupling coil 61a and protruding into the recess G2. That is, when the stator 1B is manufactured, the electric resistances of the connection portion between the slot coil 51 and the first coupling coil 61a and the connection portion between the first coupling coil 61a and the third coupling coil 63a can be measured accurately by using, as the conductor-exposed portions, the end face of the tip T of the slot coil 51 fitted to the first connection hole C1 of the first coupling coil 61a, two parts on the surface of the first coupling coil 61a that is opposite to the stator core 2, and the end face of the third coupling coil 63a that is opposite to the stator core 2.

The resistance measurement apparatus 140B illustrated in FIG. 26 includes two probe heads 143 that hold pairs of probes 144, respectively, and are arranged with a distance therebetween. The resistance measurement apparatus 140B can efficiently measure the electric resistances of the connection portion between the slot coil 51 and the first coupling coil 61a and the connection portion between the first coupling coil 61a and the third coupling coil 63a. In the second embodiment as well, when determination is made that connection failure occurs in, for example, the connection portion between the slot coil 51 and the first coupling coil 61a based on a measurement result from the resistance measurement apparatus 140B, the attachment of the coupling coil unit UAL and the like to the stator core 2 is suspended on this occasion.

Figure 27:
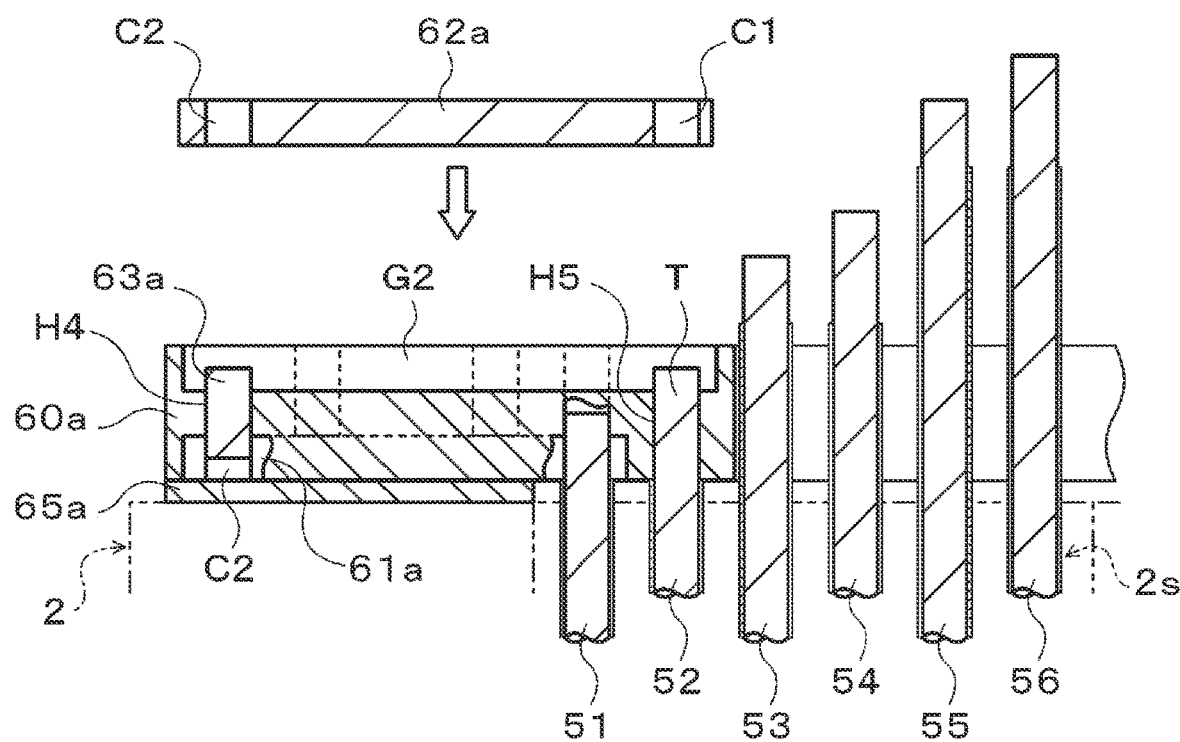
FIG. 27 is an explanatory drawing illustrating the procedure of manufacturing the stator according to the second embodiment.

After the measurement of the electric resistances is completed for all the connection portions between the slot coils 51 and the first coupling coils 61a and all the connection portions between the first coupling coils 61a and the third coupling coils 63a, as illustrated in FIG. 27, the second coupling coils 62a are fitted (arranged) to the recesses G2 of the assembly UAL' (base member 60a) collectively or by predetermined numbers each. When each second coupling coil 62a is fitted to the recess G2, the tip T of the slot coil 52 in the second layer that protrudes into the recess G2 is fitted to the first connection hole C1 of the corresponding second coupling coil 62a, and one end of the third coupling coil 63a that protrudes into the recess G2 is fitted to the second connection hole C2 of the corresponding second coupling coil 62a.

By fitting the plurality of second coupling coils 62a to the plurality of recesses G2 collectively or by predetermined numbers each, the tips T of the plurality of slot coils 52 (segment coils) in the second layer are electrically connected to the ends (first connection holes C1) of the corresponding second coupling coils 62a (segment coils) collectively or by predetermined numbers each. Thus, the tips T of the slot coil 51 in the first layer and the slot coil 52 in the second layer (inner layer side) in different slots 2s (for example, the i-th slot 2s and the (i+m−1)th slot 2s) are electrically connected via the first, second, and third coupling coils 61a to 63a, that is, the coupling coil unit UAL. In the second embodiment, the tip T of the slot coil 52 and one end of the third coupling coil 63a are fitted to the first and second connection holes C1 and C2 so as not to protrude outward from the surface of the second coupling coil 62a that is opposite to the stator core 2.

Figure 28:
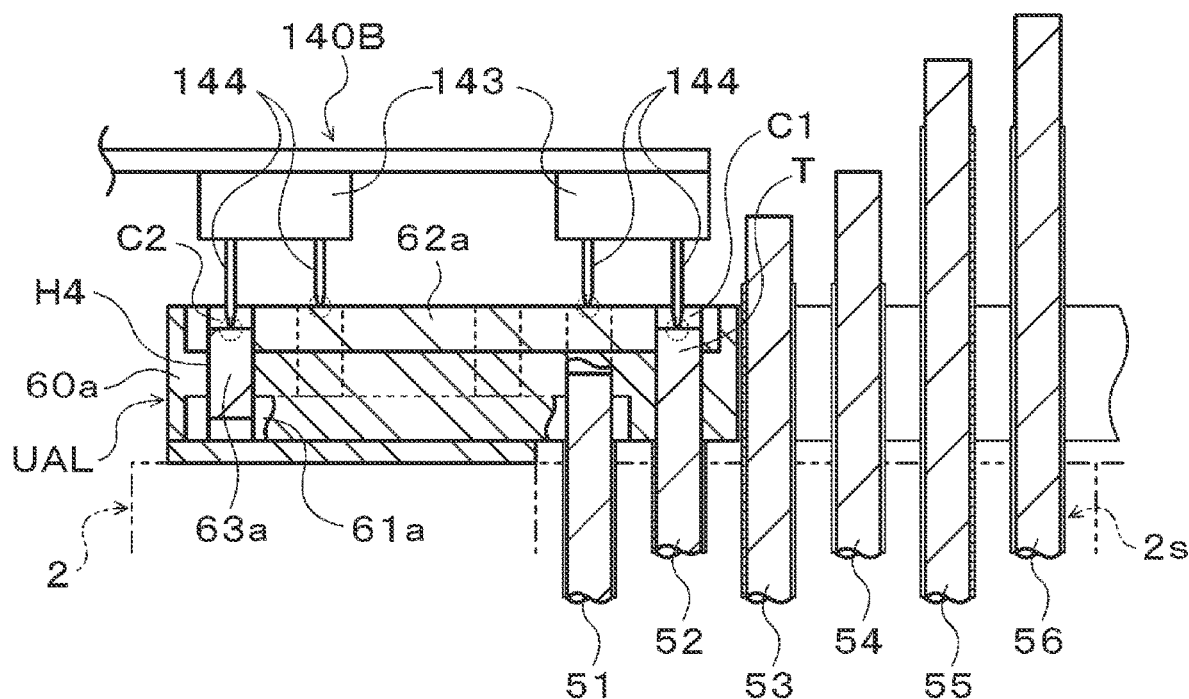
FIG. 28 is an explanatory drawing illustrating the procedure of manufacturing the stator according to the second embodiment.

When each second coupling coil 62a is fitted to the recess G2, as illustrated in FIG. 28, one of the probes 144 can be brought into contact with the end face of the tip T of the slot coil 52 through the first connection hole C1 of the second coupling coil 62a, and the other one of the probes 144 can be brought into contact with a part of the surface of the second coupling coil 62*a* that is opposite to the stator core 2. Further, one of the probes 144 can be brought into contact with the end face of the third coupling coil 63*a*, which is fitted to the second connection hole C2, through the second connection hole C2 of the second coupling coil 62*a*, and the other one of the probes 144 can be brought into contact with a part of the surface of the second coupling coil 62*a* that is opposite to the stator core 2. That is, when the stator 1B is manufactured, the electric resistances of the connection portion between the slot coil 52 and the second coupling coil 62*a* and the connection portion between the second coupling coil 62*a* and the third coupling coil 63*a* can be measured accurately by using, as the conductor-exposed portions, the end face of the tip T of the slot coil 52 fitted to the first connection hole C1 of the second coupling coil 62*a*, two parts on the surface of the second coupling coil 62*a* that is opposite to the stator core 2, and the end face of the third coupling coil 63*a* that is opposite to the stator core 2.

After the measurement of the electric resistances is completed for all the connection portions between the slot coils 52 and the second coupling coils 62*a* and all the connection portions between the second coupling coils 62*a* and the third coupling coils 63*a*, the insulating member 65*b* is arranged on the surfaces of the base member 60*a* and the plurality of second coupling coils 62*a*, that is, the coupling coil unit UAL. Further, an assembly UBL' including the base member 60*b*, the first coupling coils 61*b*, and the third coupling coils 63*b* is arranged on the insulating member 65*b* so that the recesses G2 are located opposite to the stator core 2. When the assembly UBL' is arranged on the insulating member 65*b*, the tips T of the slot coils 53 arranged in the slots 2*s* in the third layer are fitted to the first connection holes C1 of the first coupling coils 61*b* of the assembly UBL'. The tips T of the slot coils 54 arranged in the slots 2*s* in the fourth layer are inserted through the fifth through holes H5 of the assembly UBL' (base member 60*b*) so as to protrude into the corresponding recesses G2. By arranging the assembly UBL' on the insulating member 65*b*, the tips T of the slot coils 53 (segment coils) in the third layer are electrically connected collectively to the ends (first connection holes C1) of the corresponding first coupling coils 61*b* (segment coils).

Figure 29:
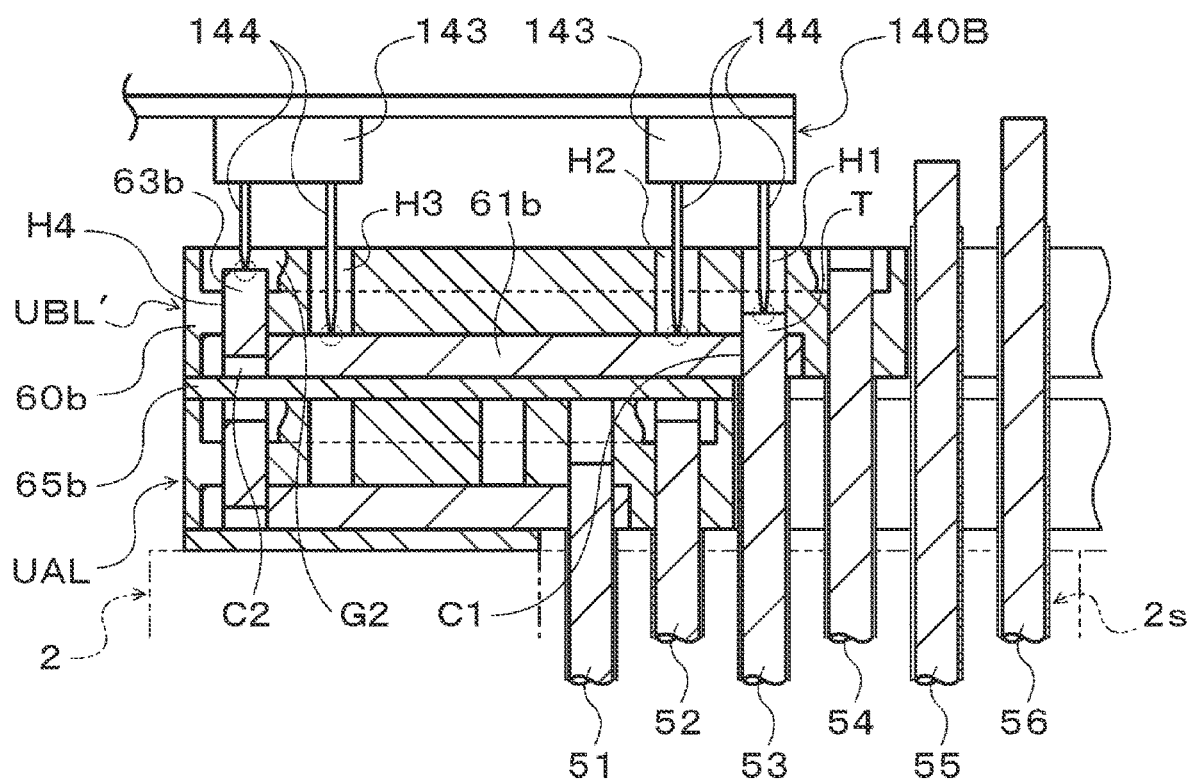
FIG. 29 is an explanatory drawing illustrating the procedure of manufacturing the stator according to the second embodiment.

When the assembly UBL' is arranged on the insulating member 65*b* and the tips T of the slot coils 53 and the other ends of the third coupling coils 63*b* are fitted to the first coupling coils 61*b*, as illustrated in FIG. 29, one of the probes 144 can be brought into contact with the end face of the tip T of the slot coil 53 through the first through hole H1, and the other one of the probes 144 can be brought into contact with a part of the surface of the first coupling coil 61*b*, to which the slot coil 53 is fitted, through the second through hole H2. Further, one of the probes 144 can be brought into contact with a part of the surface of the first coupling coil 61*b* through the third through hole H3, and the other one of the probes 144 can be brought into contact with the end face of the third coupling coil 63*b* fitted to the first coupling coil 61*b* and protruding into the recess G2. That is, when the stator 1B is manufactured, the electric resistances of the connection portion between the slot coil 53 and the first coupling coil 61*b* and the connection portion between the first coupling coil 61*b* and the third coupling coil 63*b* can be measured accurately by using, as the conductor-exposed portions, the end face of the tip T of the slot coil 53 fitted to the first connection hole C1 of the first coupling coil 61*b*, two parts on the surface of the first coupling coil 61*b* that is opposite to the stator core 2, and the end face of the third coupling coil 63*b* that is opposite to the stator core 2.

After the measurement of the electric resistances is completed for all the connection portions between the slot coils 53 and the first coupling coils 61*b* and all the connection portions between the first coupling coils 61*b* and the third coupling coils 63*b*, the second coupling coils 62*b* are fitted (arranged) to the recesses G2 of the assembly UBL' (base member 60*b*) collectively or by predetermined numbers each. When each second coupling coil 62*b* is fitted to the recess G2, the tip T of the slot coil 54 in the fourth layer that protrudes into the recess G2 is fitted to the first connection hole C1 of the corresponding second coupling coil 62*b*, and one end of the third coupling coil 63*b* that protrudes into the recess G2 is fitted to the second connection hole C2 of the corresponding second coupling coil 62*b*.

By fitting the second coupling coils 62*a* to the plurality of recesses G2 collectively or by predetermined numbers each, the tips T of the plurality of slot coils 54 (segment coils) in the fourth layer are electrically connected to the ends (first connection holes C1) of the corresponding second coupling coils 62*b* (segment coils) collectively or by predetermined numbers each. Thus, the tips T of the slot coil 53 in the third layer and the slot coil 54 in the fourth layer (inner layer side) in different slots 2*s* are electrically connected via the first, second, and third coupling coils 61*b* to 63*b*, that is, the coupling coil unit UBL.

Figure 30:
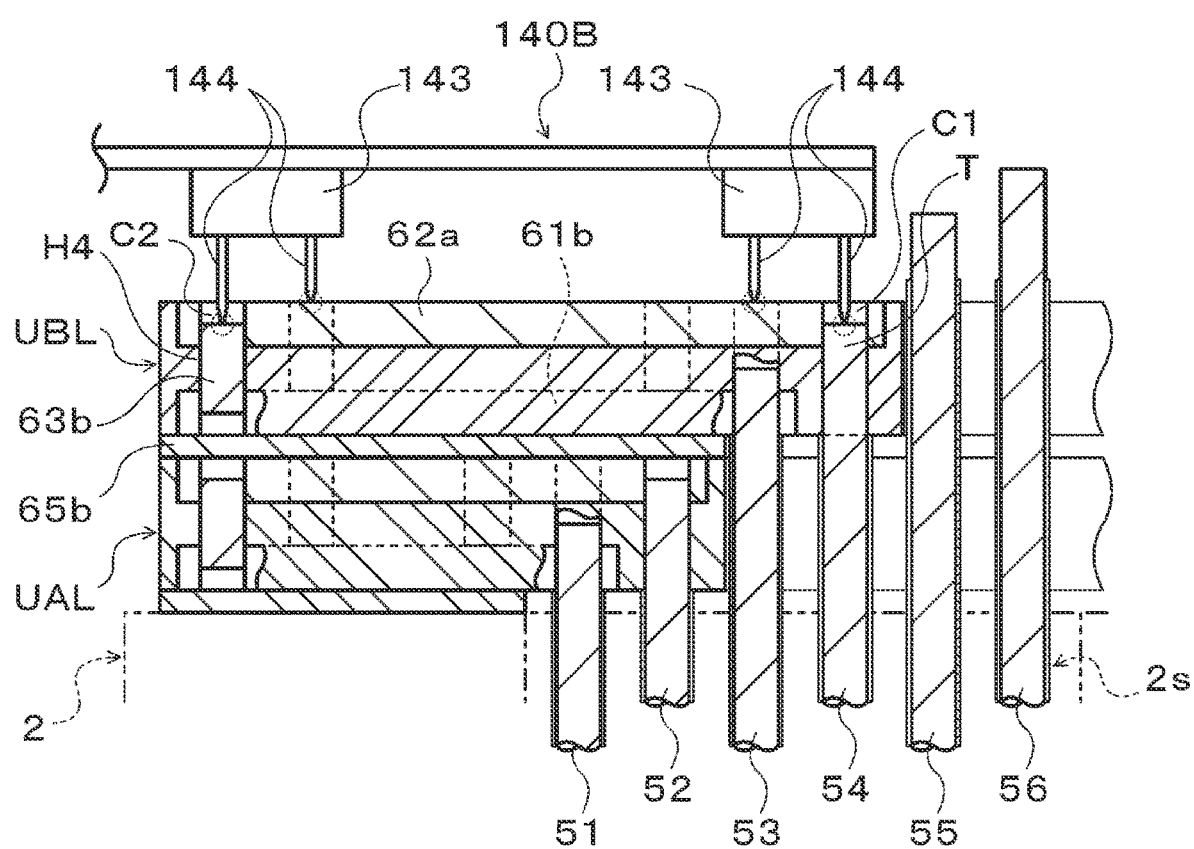
FIG. 30 is an explanatory drawing illustrating the procedure of manufacturing the stator according to the second embodiment.

When each second coupling coil 62*b* is fitted to the recess G2, as illustrated in FIG. 30, one of the probes 144 can be brought into contact with the end face of the tip T of the slot coil 54 through the first connection hole C1 of the second coupling coil 62*b*, and the other one of the probes 144 can be brought into contact with a part of the surface of the second coupling coil 62*b* that is opposite to the stator core 2. Further, one of the probes 144 can be brought into contact with the end face of the third coupling coil 63*b*, which is fitted to the second connection hole C2, through the second connection hole C2 of the second coupling coil 62*b*, and the other one of the probes 144 can be brought into contact with a part of the surface of the second coupling coil 62*b* that is opposite to the stator core 2. That is, when the stator 1B is manufactured, the electric resistances of the connection portion between the slot coil 54 and the second coupling coil 62*b* and the connection portion between the second coupling coil 62*b* and the third coupling coil 63*b* can be measured accurately by using, as the conductor-exposed portions, the end face of the tip T of the slot coil 54 fitted to the first connection hole C1 of the second coupling coil 62*b*, two parts on the surface of the second coupling coil 62*b* that is opposite to the stator core 2, and the end face of the third coupling coil 63*b* that is opposite to the stator core 2.

After the measurement of the electric resistances is completed for all the connection portions between the slot coils 54 and the second coupling coils 62*b* and all the connection portions between the second coupling coils 62*b* and the third coupling coils 63*b*, the insulating member 65*c* is arranged on the surface of the coupling coil unit UBL. Further, an assembly (not illustrated) including the base member 60*c*, the first coupling coils 61*c*, and the third coupling coils 63*c* is arranged on the insulating member 65*c* so that the recesses G2 are located opposite to the stator core 2. Thus, the tips T of the slot coils 55 (segment coils) in the fifth layer are electrically connected collectively to the ends (first connection holes C1) of the corresponding first coupling coils 61*c* (segment coils). The electric resistances are measured for the connection portion between the slot coil 55 in the fifth layer and the first coupling coil 61*c* and the connection portion between the first coupling coil 61*c* and the third coupling coil 63*c*.

Subsequently, the second coupling coils 62c are fitted to the recesses G2 of the base member 60c collectively or by predetermined numbers each, and the tips T of the plurality of slot coils 56 (segment coils) in the sixth layer (innermost layer) are electrically connected to the ends (first connection holes C1) of the corresponding second coupling coils 62c (segment coils) collectively or by predetermined numbers each. Thus, the tips T of the slot coil 55 in the fifth layer and the slot coil 56 in the sixth layer (inner layer side) in different slots 2s are electrically connected via the first, second, and third coupling coils 61c to 63c, that is, the coupling coil unit UCL. The electric resistances are measured for the connection portion between the slot coil 56 in the sixth layer and the second coupling coil 62c and the connection portion between the second coupling coil 62c and the third coupling coil 63c.

When the measurement of the electric resistances is completed for all the connection portions between the slot coils 56 and the second coupling coils 62c and all the connection portions between the second coupling coils 62c and the third coupling coils 63c, the tips T of the slot coils 51 to 56 on the lead side are electrically connected to the tips T of the corresponding slot coils 51 to 56 on the lead side by the coupling coil units UAL to UCL. Subsequently, the coupling coil units UAR, UBR, and UCR are attached to the inverse lead-side end face of the stator core 2 in accordance with the procedure described with reference to FIG. 25 to FIG. 30. Thus, the tips T of the slot coils 51 to 56 on the inverse lead side are electrically connected to the tips T of the corresponding slot coils 51 to 56 on the inverse lead side by the coupling coil units UAR to UCR. Accordingly, the winding of the stator coils 5u, 5v, and 5w around the stator core 2 is completed.

As described above, when the stator 1B is manufactured, the tips T of the slot coils 51 to 56 are connected to the ends of the corresponding first coupling coils 61a, 61b, or 61c or the second coupling coils 62a, 62b, or 62c, and the electric resistances of the connection portions between the ends are measured for each layer of the tips T of the slot coils 51 to 56. In the stator 1B finally obtained by intricately attaching the pluralities of slot coils 51 to 56, first coupling coils 61a, 61b, and 61c, second coupling coils 62a, 62b, and 62c, and third coupling coils 63a, 63b, and 63c to the stator core 2, the electric resistances can be measured by accessing all the connection portions between the ends. As a result, the reliability of the stator 1B can further be improved by identifying the connection portion between the ends where the connection failure occurs and eliminating the connection failure in the identified connection portion.

The procedure of manufacturing the stator 1B that is described with reference to FIG. 25 to FIG. 30 is also applicable to manufacture of an annular coil that is not wound around the stator core. That is, the coil disclosed herein may be manufactured in accordance with the procedure illustrated in FIG. 25 to FIG. 30 without the stator core 2 by using various jigs and the like. The coupling coil units UAL to UCR may be attached to the stator core 2 simultaneously on the lead side and the inverse lead side. In the stator 1B, at least one of the coupling coil units UAL to UCR may be split in the circumferential direction. A plurality of U-shaped segment coils may be employed in place of the slot coils 51 to 56 to omit the coupling coil units UAL to UCL on the lead side or the coupling coil units UAR to UCR on the inverse lead side.

It is understood that the disclosure disclosed herein is not limited to the embodiments described above and various modifications may be made within the extensive scope of the disclosure. The embodiments described above are merely specific modes of the disclosure described in the "SUMMARY" section, and is not intended to limit the elements of the disclosure described in the "SUMMARY" section.

The disclosure disclosed herein is applicable to, for example, industry for manufacturing a stator for a rotating electrical machine.

What is claimed is:

1. A stator, comprising:
a stator core including a plurality of slots extending in a radial direction and formed at intervals in a circumferential direction; and
a plurality of segment coils that form a stator coil through electrical connection between corresponding ends, at least parts of the segment coils being attached to the stator core so as to adjoin each other in the radial direction in each of the slots, the corresponding ends of the segment coils being electrically connected together via a coupling member or by being fitted together, each of the segment coils including a conductor-exposed portion located close to a connection portion between the corresponding segment coils and configured to be brought into contact with a probe of a resistance measurement apparatus.

2. The stator according to claim 1, further comprising a plurality of the coupling members each electrically connecting the ends of the segment coils fitted to both ends of each of the coupling members, wherein:
each of the segment coils is a conductor having an insulating film formed on its surface;
the conductor is exposed at the end of each of the segment coils; and
the conductor-exposed portion is a part of the end of each of the segment coils, which is exposed from the coupling member.

3. The stator according to claim 2, wherein:
the coupling member is a tubular conductor having an insulating film formed on its surface; and
the end of each of the segment coils includes
a thin portion fitted into the coupling member, and
a thick portion formed so as not to be fitted into the coupling member.

4. The stator according to claim 2, wherein:
the coupling member is a tubular conductor having an insulating film formed on its surface; and
the coupling member includes a restriction member that restricts entry of the end of each of the segment coils into the coupling member so that the part of the end is exposed from the coupling member.

5. The stator according to claim 1, wherein:
the segment coils include
a first segment coil including two legs inserted into the slots different from each other from one end face of the stator core, and
a second segment coil including two legs inserted into the slots different from each other from another end face of the stator core;
the end of the first segment coil and the end of the second segment coil are tips of the legs; and
the end of the first segment coil and the end of the second segment coil are electrically connected together by the coupling member in each of the slots.

6. The stator according to claim 5, wherein:
the slots are open to a central hole of the stator core; and
in each of the first segment coil and the second segment coil, one of the two legs, which is arranged on an inner side in the radial direction, is shorter than the other one of the two legs, which is arranged on an outer side in the radial direction.

7. The stator according to claim 1, wherein:
the segment coils include
- a plurality of slot coils inserted into the corresponding slots,
- a plurality of first coupling coils each having a first connection hole formed at one end of each of the first coupling coils, and a second connection hole formed at another end of each of the first coupling coils, the first coupling coils being arranged along an end face of the stator core,
- a plurality of second coupling coils each having a first connection hole formed at one end of each of the second coupling coils, and a second connection hole formed at another end of each of the second coupling coils, the second coupling coils being arranged on an outer side of the first coupling coils in an axial direction of the stator core, and
- a plurality of third coupling coils each fitted to the second connection hole of each of the first coupling coils and the second connection hole of each of the second coupling coils;

the ends of the slot coils different from each other are fitted to the first connection hole of each of the first coupling coils and the first connection hole of each of the second coupling coils, the end of the slot coil fitted to the first connection hole of each of the first coupling coils is electrically connected to the end of the slot coil fitted to the first connection hole of each of the second coupling coils via each of the first coupling coils, each of the third coupling coils, and each of the second coupling coils; and the conductor-exposed portions include
- an end face of the end of the slot coil fitted to the first connection hole of each of the first coupling coils,
- two parts on a surface of each of the first coupling coils, which is opposite to the stator core,
- an end face of each of the third coupling coils, which is opposite to the stator core,
- two parts on a surface of each of the second coupling coils, which is opposite to the stator core, and
- an end face of the end of the slot coil fitted to the first connection hole of each of the second coupling coils.

8. The stator according to claim 7, further comprising a base member formed of an insulating material, wherein:
- the first coupling coils are arranged on one surface of the base member, which is located close to the stator core;
- the second coupling coils are arranged on another surface of the base member, which is located away from the stator core; and
- the base member has
  - a first through hole that communicates with the first connection hole of each of the first coupling coils,
  - a second through hole located close to the first connection hole of each of the first coupling coils and arranged so as to reach the surface of each of the first coupling coils, which is opposite to the stator core,
  - a third through hole located close to the second connection hole of each of the first coupling coils and arranged so as to reach the surface of each of the first coupling coils, which is opposite to the stator core,
  - a fourth through hole that communicates with the second connection hole of each of the first coupling coils and the second connection hole of each of the second coupling coils, and
  - a fifth through hole that communicates with the first connection hole of each of the second coupling coils.

9. An annular coil, comprising a plurality of segment coils in which corresponding ends are electrically connected together, at least parts of the segment coils being arranged so as to adjoin each other in a radial direction, the annular coil including a plurality of layers each including the ends of the segment coils adjacent to each other in a circumferential direction, the layers being arranged in the radial direction, wherein:
- the corresponding ends are electrically connected together via a coupling member or by being fitted together; and
- each of the segment coils includes a conductor-exposed portion located close to a connection portion between the corresponding segment coils and configured to be brought into contact with a probe of a resistance measurement apparatus.

\* \* \* \* \*